United States Patent
Knapp et al.

(10) Patent No.: US 6,861,942 B1
(45) Date of Patent: Mar. 1, 2005

(54) DIRECTIONALLY-ADJUSTABLE ANTENNA SYSTEM USING AN OUTSIDE MIRROR FOR AUTOMOTIVE APPLICATIONS

(75) Inventors: Robert C. Knapp, Coloma, MI (US); David L. Plangger, Stevensville, MI (US); Robert R. Turnbull, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 09/359,144

(22) Filed: Jul. 21, 1999

(51) Int. Cl.⁷ .............................................. H03K 17/00
(52) U.S. Cl. ................ 340/2.8; 340/539.1; 340/426.16; 455/277.1; 455/99; 342/362; 343/711; 343/893
(58) Field of Search ........................ 340/2.8, 902, 928, 340/995.13, 425.5, 426.16–426.21, 438, 439, 442, 539.1, 2.1, 5.71, 5.7, 5.72; 455/277.1, 99; 342/36, 417, 423, 437; 343/711, 893

(56) References Cited

U.S. PATENT DOCUMENTS

| | | | |
|---|---|---|---|
| 4,210,357 A | 7/1980 | Adachi | |
| 4,510,484 A | 4/1985 | Snyder | |
| 4,672,375 A | 6/1987 | Mochida et al. | |
| 4,734,674 A | 3/1988 | Thomas et al. | |
| 4,761,645 A | 8/1988 | Mochida | |
| 4,868,915 A | 9/1989 | Anderson, III et al. | |
| 4,873,530 A | 10/1989 | Takeuchi et al. | |
| 4,966,034 A | 10/1990 | Bock et al. | |
| 4,970,491 A | 11/1990 | Saint et al. | |
| 4,978,941 A | 12/1990 | Brown | |
| 5,001,457 A | 3/1991 | Wang | |
| 5,061,917 A | 10/1991 | Higgs et al. | |
| 5,463,374 A | 10/1995 | Mendez et al. | |
| 5,504,478 A * | 4/1996 | Knapp | 340/825.69 |
| 5,512,901 A | 4/1996 | Chen et al. | |
| 5,532,709 A * | 7/1996 | Talty | 343/819 |
| 5,581,023 A | 12/1996 | Handfield et al. | |
| 5,600,301 A | 2/1997 | Robinson, III | |
| 5,612,671 A | 3/1997 | Mendez et al. | |
| 5,729,236 A * | 3/1998 | Flaxl | 342/374 |
| 5,774,048 A | 6/1998 | Achterholt | |
| 5,991,613 A * | 11/1999 | Euscher et al. | 455/277.1 |
| 6,131,022 A * | 10/2000 | Jacomb-Hood et al. | 455/276.1 |
| 6,223,123 B1 * | 4/2001 | Ryan et al. | 701/207 |
| 6,278,869 B1 * | 8/2001 | Lindenmeier et al. | 455/277.1 |
| 6,313,783 B1 * | 11/2001 | Kuntman et al. | 342/32 |
| 6,707,375 B2 * | 3/2004 | Masudaya | 340/5.61 |

* cited by examiner

Primary Examiner—Daryl C. Pope
(74) Attorney, Agent, or Firm—Price, Heneveld, Cooper, DeWitt & Litton, LLP

(57) ABSTRACT

A vehicle antenna system incorporated into at least one side-view mirror of a vehicle includes a forward directed antenna and a rearward directed antenna to transmit and receive signals over corresponding forward and rearward-directed detection fields, respectively. The antennas act as directional transmitters and/or receivers, and a processing circuit discriminates between signals from different antennas without requiring any of the antennas to transmit identification signals to the processing circuit. Signal discrimination is conducted in part by sequentially selecting each antenna to obtain a corresponding antenna signal and, if required for a particular application, comparing the obtained signal with previously obtained antenna signals. The vehicle antenna system can be used, for example, in conjunction with tire pressure sensors to detect low tire pressure in a particular tire.

75 Claims, 16 Drawing Sheets

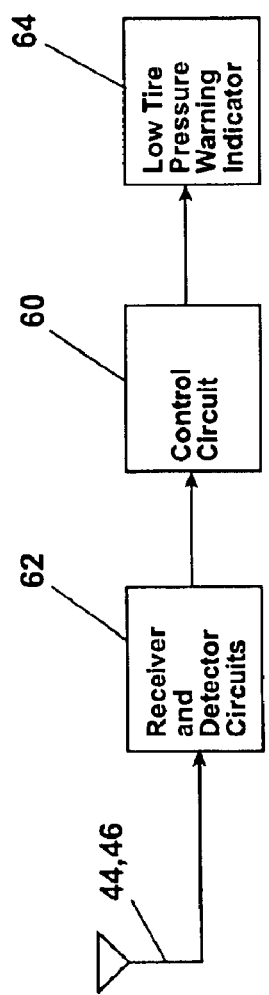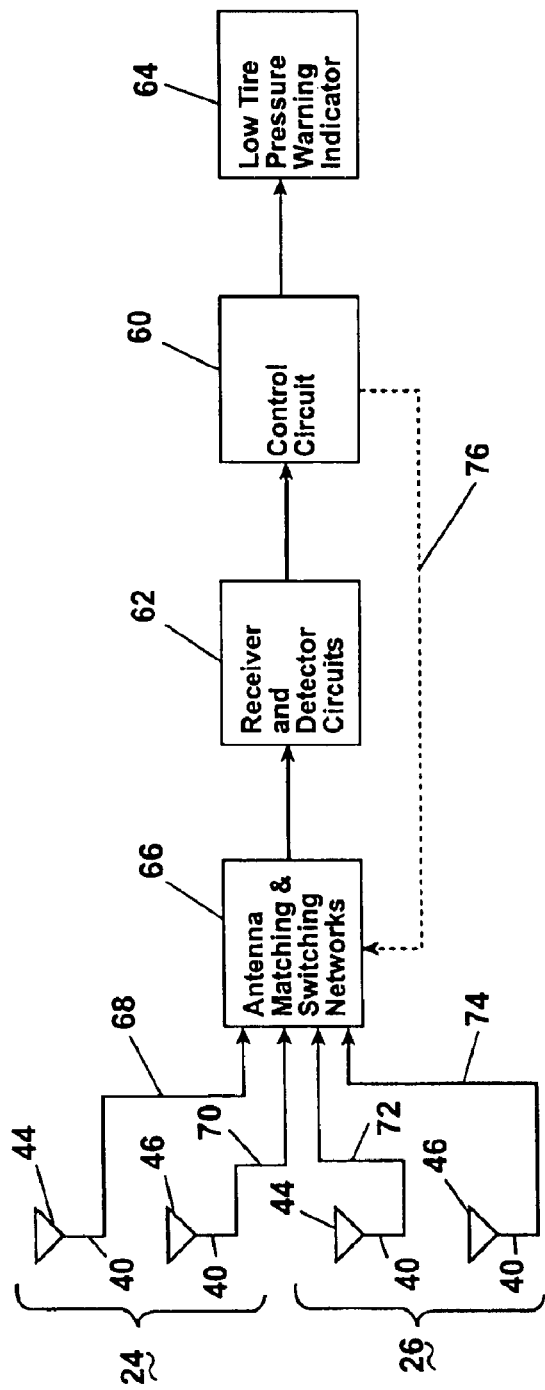

DIRECTIONALLY-ADJUSTABLE ANTENNA SYSTEM USING AN OUTSIDE MIRROR FOR AUTOMOTIVE APPLICATIONS

FIELD OF THE INVENTION

The invention relates to an antenna system for a vehicle for monitoring various vehicle internal diagnostic functions and for transmitting/receiving to and from remote transmitting/receiving stations external to the vehicle. More particularly, the antenna system relates to exterior rear view mirror mounted antennas on the vehicle which can be directionally activated to detect or transmit selected signals.

BACKGROUND ART

Insufficiently inflated or over-inflated tires for vehicles present an often unknown danger to drivers and passengers of the vehicles. This improper inflation can cause poor handling, poor traction, reduced fuel efficiency and can cause tire failures if left improperly inflated for a period of time. A visual inspection of a vehicle's tires can provide some indication of the level of inflation of the tires. However, this method is extremely inaccurate and newer "run flat" tires often retain some degree of structural integrity even after losing inflation pressure making a visual inspection of the internal tire pressure nearly impossible. Further, it is suspected that many vehicle owners often neglect to examine the level of inflation in their vehicle's tires for extended periods of time. Therefore, it is desirable to provide a vehicle with an internal tire pressure sensing system for determining the level of inflation in the vehicle's tires and alerting the operator if the level is outside a preselected operating range.

Several solutions to the problem of detecting and monitoring tire pressure have been proposed in the past. Typically, known tire pressure sensors include a transmitter mounted within the tire (often to the wheel) adjacent to, or integral with, a valve stem therefor. Because the tire pressure sensors detect and transmit a value proportional to the pressure in the tire, this value is typically normalized to compensate for variations in the ambient temperature to prevent inaccurate readings due to air expansion from temperature variations. Further, tires tend to heat up after extended periods of use, also requiring correction for temperature variations. Some examples of tire pressure sensors which include correction for temperature variations are taught by U.S. Pat. Nos. 4,567,459, 4,703,650, and 4,966,034.

Due to the physical constraints presented by the location of the tire pressure sensor within the tire and the impracticability of running wire leads from the tire pressure sensor to a control unit within the vehicle, it is desirable to employ a wireless transmission system to relay the data output by the tire pressure sensor to the control unit. In addition to the above-mentioned patents, examples of wireless transmission systems employing means such as radio transmitters are shown in U.S. Pat. Nos. 4,510,484, 4,554,527, and 5,061,917. The tire pressure sensors can include a wireless transmitter-such as that shown in U.S. Pat. No. 4,978,941. In addition to radio transmissions, each of the vehicle's tires can be coded with a unique digital value such as that shown in U.S. Pat. Nos. 5,001,457 and 5,061,917.

Referring now to the drawings and to FIG. 1 in particular, a vehicle 10 is shown having a generally well-known configuration: four ground-engaging wheels 12 with a spare tire 14 located in a trunk portion 16 of the vehicle 10. The vehicle 10 is also provided with conventional windshields, one forward windshield 18 and one rearward windshield 20. The forward windshield 18 is provided with a conventional rear view mirror 22. A driver-side external rear view mirror 24 and a passenger-side rear view mirror are located adjacent the forward windshield 18, typically positioned on corresponding front doors (not shown) of the vehicle 10. Each of the external mirrors 24 and 26 is preferably provided with an antenna system. An example of a prior art antenna system in which a radio frequency antenna is mounted within an exterior mirror for a vehicle is shown in commonly-assigned U.S. Pat. No. 5,504,478 to Knapp, issued Apr. 2, 1996 and is incorporated herein by reference.

Several problems have been encountered with the known wireless tire pressure sensor systems. These systems require internal calibration to ensure proper display of information and typically need recalibration if transmitters (or the tires they are mounted to) are replaced or rotated. This calibration and recalibration is an inevitable consequence of the requirement for a uniquely coded transmitter corresponding to the location of the tire on the vehicle. Thus, the system knows if it is detecting a front drivers-side tire pressure, a rear passengers-side tire pressure, etc., depending upon the code detected by the system.

U.S. Pat. No. 5,600,301 shows an example of a remote tire pressure sensing system wherein each of the tire pressure sensors has a transmitter provided with a unique code at manufacture.

FIG. 2 is a perspective view of an example of a wheel 12 for the vehicle 10 provided with a prior art tire pressure sensor 28 adapted to send a signal detectable by an antenna system on one of the external rear view mirrors 24 and 26. Each of the wheels 12 (and the spare tire 14) of the vehicle 10 are preferably provided with a tire pressure sensor 28 which is adapted to transmit a signal corresponding to the pressure within the wheel 12 (or the spare tire 14).

The tire pressure sensor 28 is shown in greater detail in FIG. 3 and preferably comprises a body 30 having a valve stem 32. The valve stem 32 is used to inflate or exhaust pressurized air from within the wheel 12 (when encased by a conventional tire). The body 30 preferably contains a well-known pressure sensor and circuitry adapted to transmit a signal corresponding to the pressure detected by the tire pressure sensor 28. Each tire pressure sensor 28 thereby must transmit the unique code in addition to the pressure signal to a receiver at different intervals to provide an indication of the tire pressure in each of the tires.

One problem with the above-described system is that an initialization procedure must be performed to determine the location of each particular tire pressure sensor on the vehicle. Each transmitter is designed to transmit tire pressure and identification data when a magnet is held in close proximity. The initialization process is performed by placing the receiver in a learning mode and then triggering the transmitter in each tire pressure sensor with a magnet in a predetermined sequence. In this manner, the receiver can associate each tire pressure sensor's unique code during the initialization sequence to determine the tire's relative position on the vehicle. As an example, the initialization is begun by triggering the front driver-side tire transmitter first and then triggering each of the other tire transmitters in a counterclockwise sequence around the vehicle.

Several additional problems have been encountered with this prior art system. First, each transmitter requires a magnetic sensor to "activate" it during the initialization process adding cost to the transmitter and requiring additional space within the transmitter.

Second, the system must be recalibrated when tires are rotated or replaced causing inconvenience to the vehicle operator and necessitating at least one performance of the initialization process to enable the receiver to "relearn" the location of the tire pressure sensors.

Third, the receiving antenna is likely required to be omni-directional and centrally located within the vehicle, requiring increased signal strength from each transmitter due to the signal shielding effect from the vehicle's structure, including radio frequency shielding windows such as "tinted", low e value windows, requiring higher transmitter power and/or a higher receiver sensitivity. A higher power transmitter can reduce battery life and add to the system cost. A higher receiver sensitivity can increase cost and increase susceptibility to unwanted signals.

Fourth, because the transmitters are not synchronized, it is possible that two or more transmissions could occur at nearly the same instant, making the transmitted signals undecipherable, especially with a centrally-located antenna.

Fifth, the transmitter in each tire pressure sensor in the system described above requires a unique code so that the receiver can distinguish each transmitter's relative position after initialization. As the number of vehicles equipped with these types of tire pressure sensing systems increases, a data frame of increased length (typically additional digits or characters) would be required to ensure uniqueness, thereby decreasing battery life due to increased use.

Sixth, with systems having an omni-directional antenna, the instant vehicle and vehicles adjacent to it would result in cross-detection of tire pressure sensor transmissions between adjacent vehicles resulting in erroneous pressure data.

Further, wireless transmission of other vehicle diagnostic data is becoming more common which increases the probability that the various signals transmitted around the vehicle's interior and exterior will cause interference and thus reduce the effectiveness of the various wireless transmission systems. Also, while attention has been paid in the past to selection of appropriate transmission frequencies to avoid interference from other radio frequency sources, particular problems are presented by remote control systems, such as keyless entry systems, garage door openers, etc., which are becoming more and more widely implemented. These exterior transmission signals can also cause additional interference and require additional antenna arrays to be built into the vehicle receiving systems.

SUMMARY OF THE INVENTION

Accordingly, a vehicle antenna system according to the present invention monitors various vehicle internal diagnostic functions as well as enables signal receptions/transmissions to remote transmitting/receiving stations external to the vehicle. In one aspect, the antenna system relates to a system having a directional antenna mounted to each exterior rear-view mirror on the vehicle which can be selectively directionally adjusted to detect the various vehicle internal diagnostic functions, e.g., tire pressure, as well as directed externally of the vehicle to enable communications with systems remote from the vehicle.

The antenna system provided on the vehicle external mirrors can be used to improve apparent electromagnetic signal strength for various vehicular applications, e.g., detecting signals generated by a tire pressure sensor adapted to emit a radio frequency signal proportional to the pressure contained in a vehicle tire. The antenna system can also be used to discriminate signal transmission source locations.

The antenna system comprises forward and rearward directed antenna elements in the vehicle's exterior mirror housings and, optionally, an antenna in the interior rear view mirror housing and combinations thereof. A receiver can be provided within the vehicle which is interconnected to the antenna system so that each antenna in the system can be selectively switched in or out of the vehicle's receiver and transmitter circuits, respectively.

There are several applications which can employ the antenna system described herein to advantage. For example, multiple receiving antennas can be used to discriminate the individual locations of multiple transmitters, e.g., tire pressure sensor signaling devices. Multiple receiving antennas can be used to expand the reception range of a transmitted signal, e.g., remote keyless entry (RKE) signals. Multiple transmitting antennas can be used to expand transmission range and coverage, e.g., transmitting an amplified garage door opener signal. A pre-selected transmitting antenna can be used to control transmission directionality, e.g., to transmit to a receiver such as a parking ramp gate, radio-controlled parking meter or an automated toll collection booth. Other vehicular applications for which this antenna array could be utilized include, but are not limited to, cellular telephone signal reception, roadway navigation, location and information, traffic control, safety, security, parking, and vehicular identification and statistical information, e.g., traffic counting applications. These and other uses will be described below in greater detail after the structural components and functions are identified with reference to the drawings.

BRIEF DESCRIPTION OF THE DRAWINGS

FIG. 8 is a schematic view of a control circuit for a single antenna system provided on one of the rear view mirrors;

FIG. 9 is a schematic view of the control circuit of FIG. 8 modified to support multiple forwardly- and rearwardly-directed antennas on the driver-side rear view mirror as well as forwardly- and rearwardly-directed rear view mirrors on the passenger-side rear view mirror;

DETAILED DESCRIPTION OF THE PREFERRED EMBODIMENTS

Figure 1:
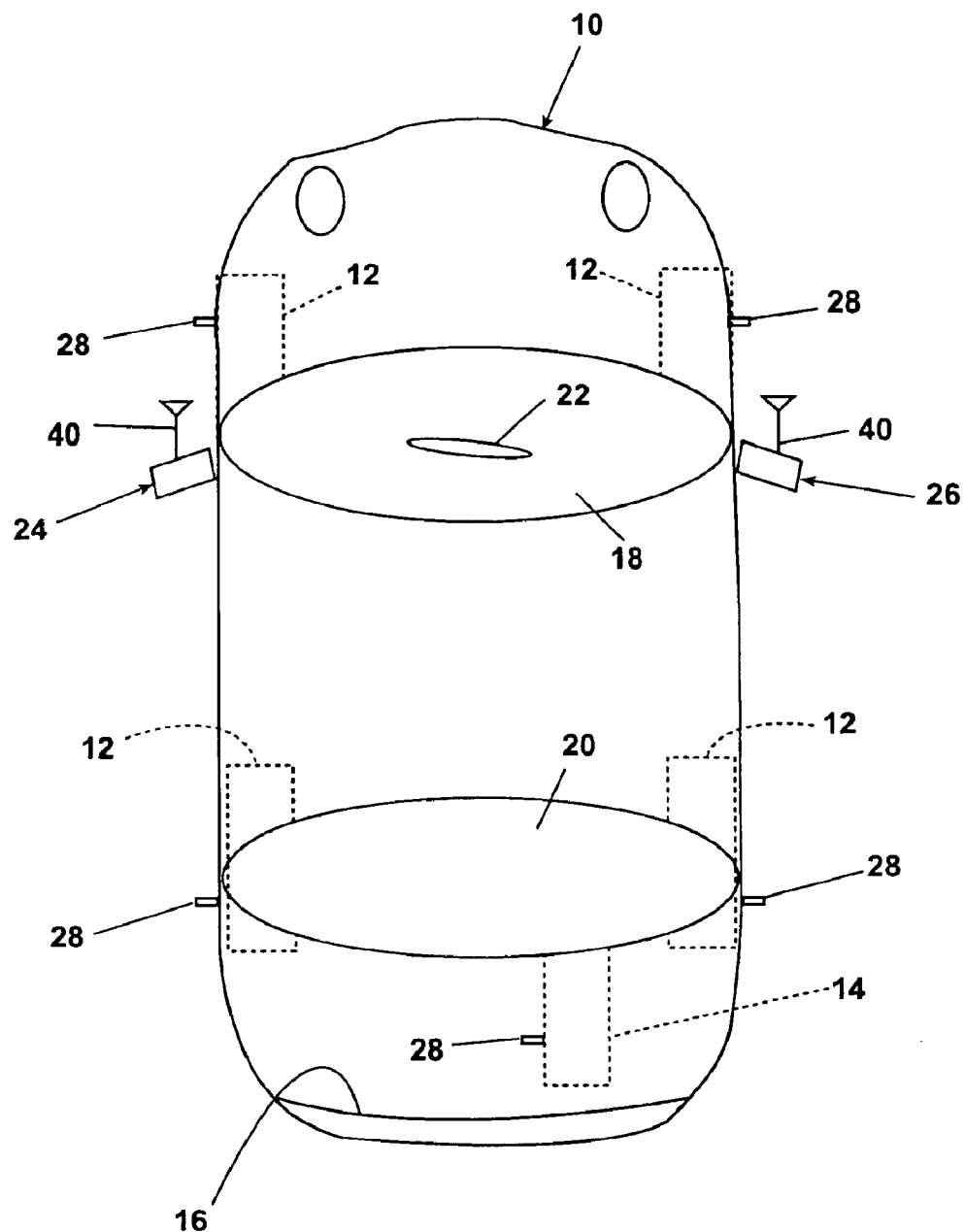
FIG. 1 is a top schematic view of a vehicle having a prior art antenna system provided in both outside rear view mirrors and a vehicle internal diagnostic sensing system comprising a transmitting antenna interconnected with a tire pressure sensor in each of road-engaging tires thereon and in a spare tire provided therewith in a trunk portion of the vehicle.
Figure 2:
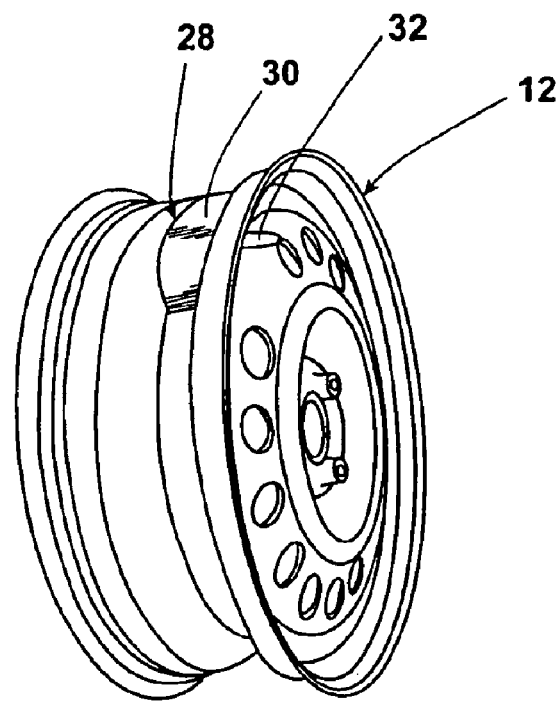
FIG. 2 is a perspective view of a wheel for the vehicle of FIG. 1 provided with a prior art tire pressure sensor adapted to send a signal to the antenna system of one of the outside rear view mirrors of FIG. 1.
Figure 3:
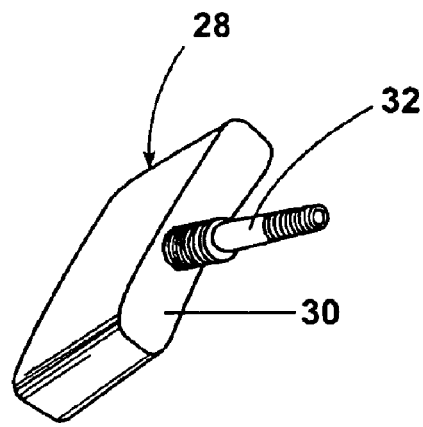
FIG. 3 is an enlarged, perspective view of the prior art tire pressure sensor of FIG. 2.
Figure 4:
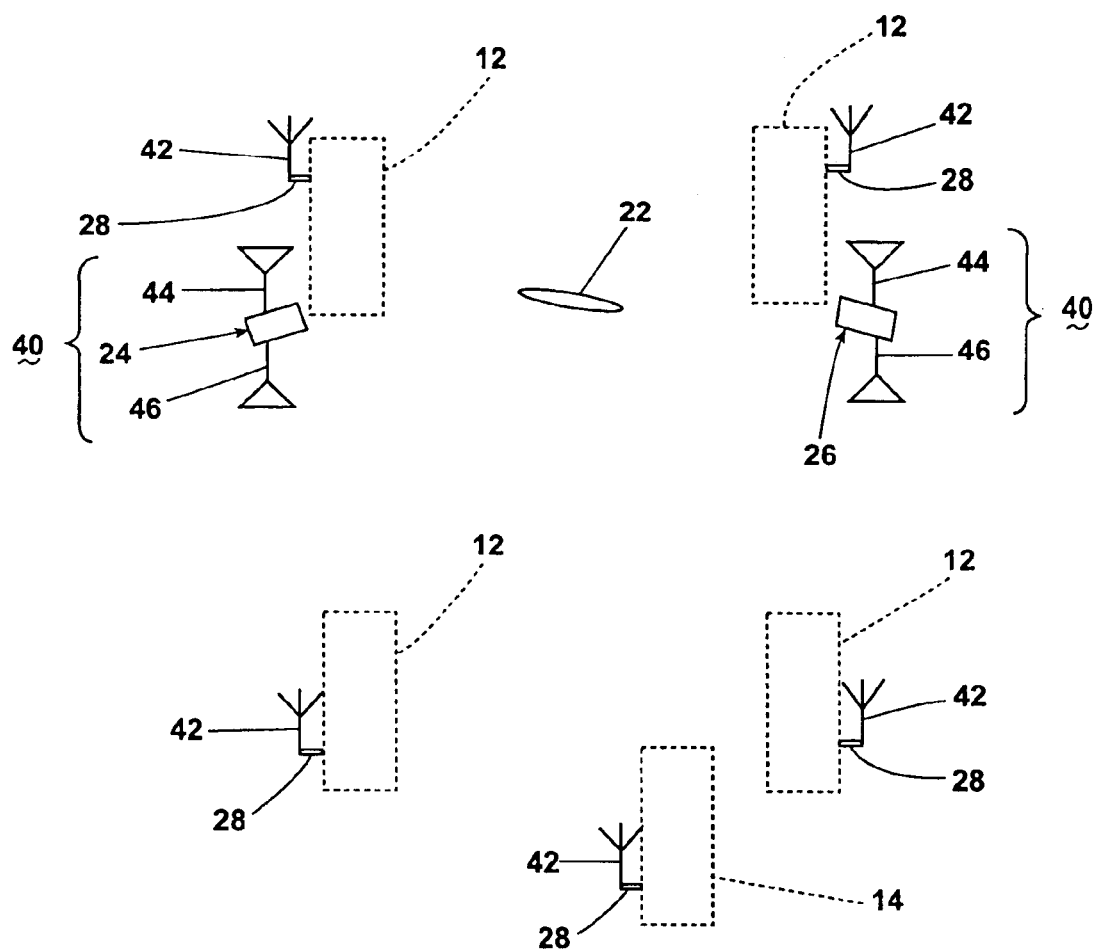
FIG. 4 is a top schematic view in a similar orientation as FIG. 1 showing a schematic representation of a transmitting antenna provided on each of the tire pressure sensors of the vehicle internal diagnostic sensing system and a schematic representation of a receiving antenna according to the invention shown on each of the outside rear view mirrors of the vehicle.

FIG. 4 is a top schematic view in a similar orientation as FIG. 1 showing one embodiment of the present invention as a schematic representation of a tire pressure transmitting antenna 42 provided on each of the tire pressure sensors 28 of the vehicle 10. It will be understood that the transmitting antenna 42 is a conventional component of the tire pressure sensor shown in FIGS. 2 and 3.

FIG. 4 also shows an antenna system 40 according to the invention on each external mirror 24 and 26 comprising a forwardly-directed antenna 44 and a rearwardly-directed antenna 46. Each of the antennas 44 and 46 can comprise a dielectric or metallic coating on glass for the mirrors 24 and 26 (such as in an electrochromic mirror), a wire antenna provided within the mirror housing, or any other well-known conventional monopole, dipole, helical, patch or other antennas known in the art. Many variations in the types of antennas 44 and 46 are contemplated without departing from the scope of this invention.

Figure 5:
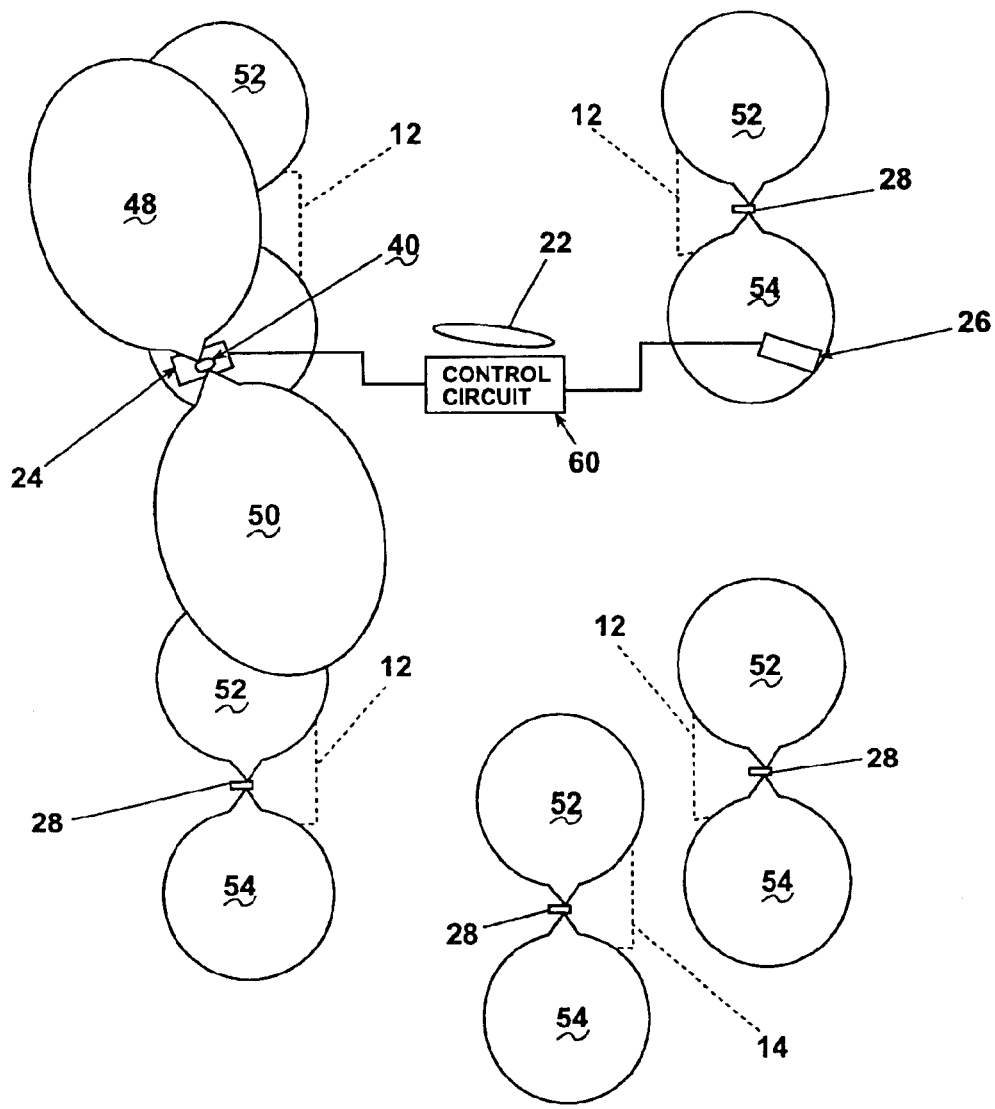
FIG. 5 is a top schematic view in a similar orientation as FIG. 1 showing antenna transmitting fields for the tire pressure sensors in each of the road-engaging wheels thereon and a forward- and rearwardly-directed antenna detecting field for the antenna system provided on the driver side rear view mirror.

Each of the antennas 44 and 46 is adapted to detect a signal from a remote source within a particular localized area of the particular antenna 44, 46. FIG. 5 shows example signal detection fields 48 and 50 for the antennas 44 and 46, respectively. It will be understood that, although the signal detection fields 48 and 50 are shown only for the antennas 44 and 46 of the antenna system 40 of the driver-side mirror 24, the fields 48 and 50 are similarly oriented for the passenger-side mirror 26. FIG. 5 also shows examples of typical forward and rearward transmission fields 52 and 54, respectively, for the transmitting antenna 42 in each of the tire pressure sensors 28 on the wheels 12 and the spare tire 14.

It should be noted that the forward signal detection field 48 of the antenna system 40 of the driver-side external mirror 24 preferably substantially overlaps the forward transmission field 52 of the tire pressure sensor 28 on the forward driver-side wheel 12. The rearward signal detection field 50 preferably substantially overlaps the rearward transmission field 54 of the tire pressure sensor 28 on the rearward driver-side wheel 12. Accordingly, although not shown in FIG. 5, the fields 48 and 50 of the antenna system 40 of the passenger-side external mirror 26 preferably substantially overlap the fields 52 and 54 of the tire pressure sensors 28 on the passenger-side wheels 12 as well.

Figure 6:
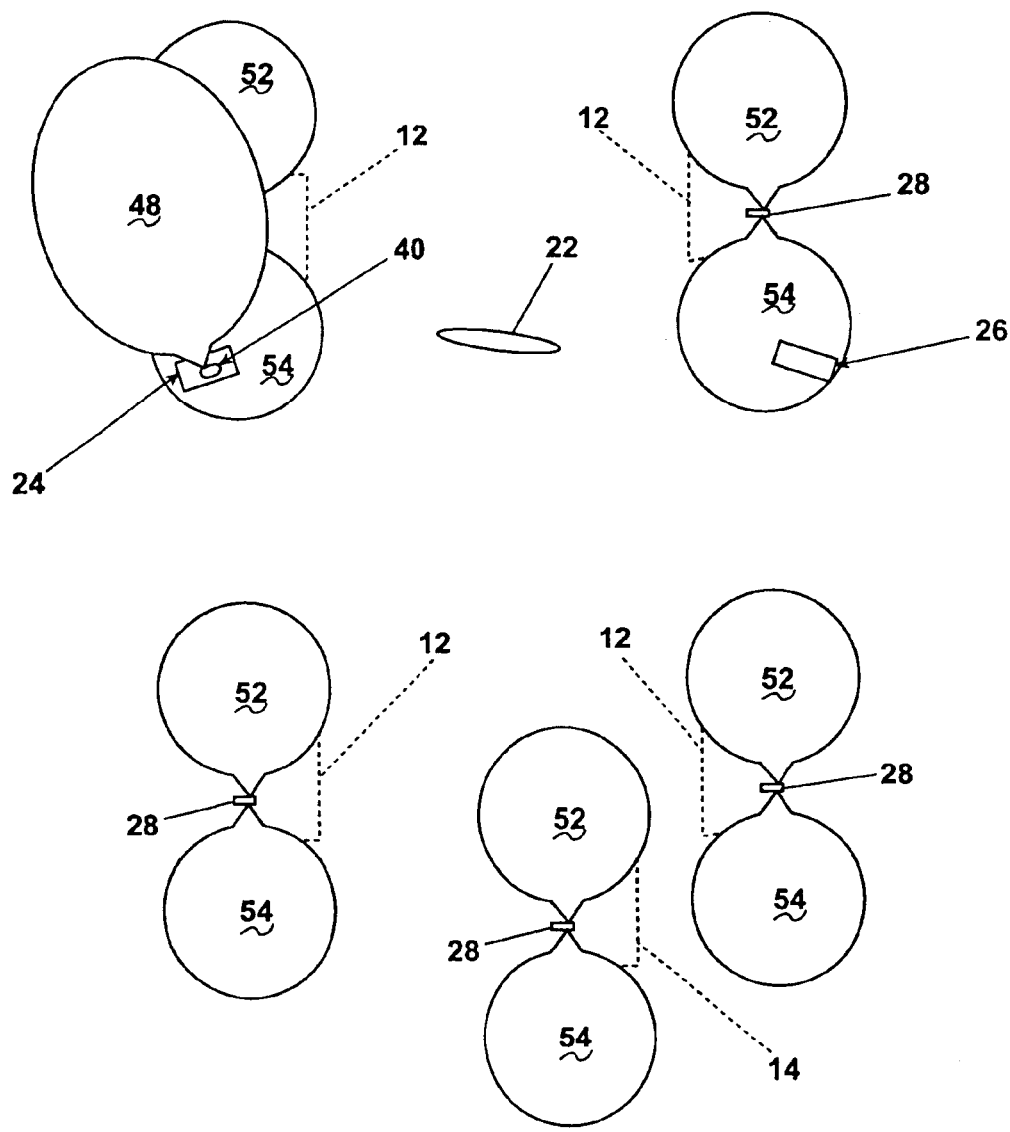
FIG. 6 is a top schematic view in a similar orientation as FIG. 5 showing the detecting field of the driver-side rear view mirror directed in the forward direction.
Figure 7:
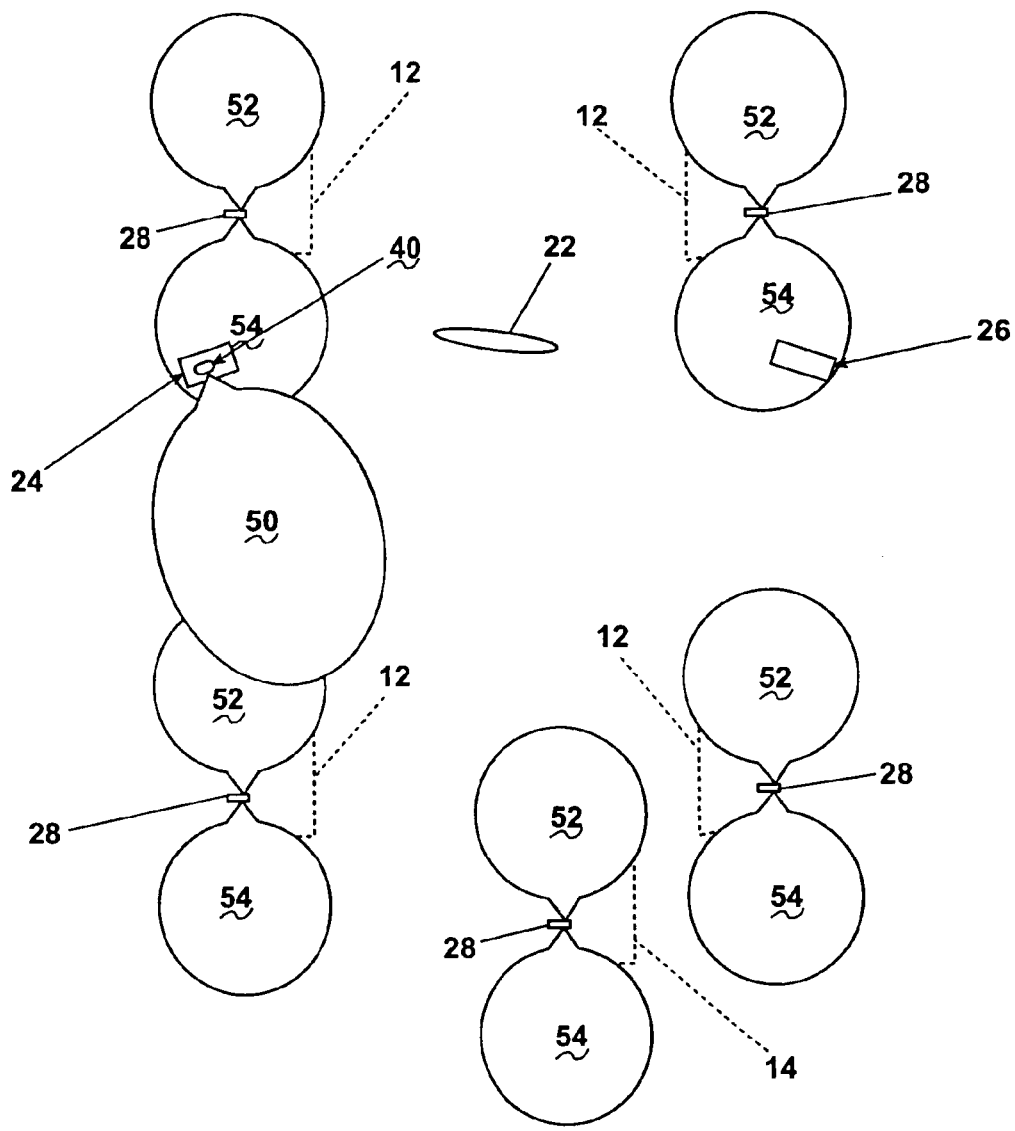
FIG. 7 is a top schematic view in a similar orientation as FIG. 5 showing the detecting field of the driver-side rear view mirror directed in the rearward direction.

It is an important feature of the invention that the antennas 44 and 46 of the antenna system 40 be interconnected to a matching network (as is known in the art) which maximizes the received signal strength so that a signal from a particular antenna can be detected and processed most accurately. Along these lines, FIGS. 6 and 7 show the forwardly- and rearwardly-directed antennas 44 and 46, respectively, being actuated wherein one of the antennas 44 and 46 is actuated while the other is not. A detection of the tire pressure in a particular wheel 12 can thereby be more accurately obtained.

For example, FIG. 6 shows the forwardly-directed antenna 44 being actuated by the presence of only the forward signal detection field 48 which provides an indication of the tire pressure in only the forward driver-side wheel 12. It will be understood that the particular selected antenna may detect other signals during processing, but that the antenna is interconnected to a "peak detection" circuit which enables a controller to discriminate signal strengths and attenuate unwanted signals such as by reducing receiver gain. Conversely, FIG. 7 shows the rearwardly-directed antenna 46 being actuated by the presence of only the rearward signal detection field 50 which provides an indication of the tire pressure in only the rear driver-side wheel 12.

Of course, the antenna system 40 is preferably interconnected to a circuit which is described in greater detail in FIG. 8. FIG. 8 shows a schematic example of a simplified circuit for a single antenna 44 or 46 of the antenna system 40. The antenna 44, 46 is operably interconnected to a control circuit 60 via a receiver/detector circuit 62 which is a conventional component used to relay antenna signals. Any signal detected from the antenna 44, 46 is sent by the receiver/detector circuit 62 to the control circuit 60.

The control circuit 60 can also convert the signal to a pressure value and output a display of the detected pressure value or limit on a visual or audio indicator 64 so that the vehicle operator can interpret the results. The control circuit 60 compares the pressure value with a predetermined desired pressure value. The predetermined pressure value can be set according to tire manufacturer's specifications, vehicle ride specifications and the like. If the detected pressure value exceeds or is less than the predetermined pressure value (or range) by a preselected amount, a warning message can be displayed or sounded on the indicator 64 to alert the vehicle operator of an unsafe tire pressure condition.

FIG. 9 is a schematic view of the circuit of FIG. 8 modified so that the control circuit 60, receiver/detector circuit 62 and the indicator 64 can be selectively interconnected to each of the antennas 44 and 46 of the antenna systems 40 provided on the driver-side and passenger-side mirrors 24 and 26 by an antenna matching/switching network 66. It will be understood that elements common to both FIG. 8 and FIG. 9 are referred to with common reference numerals.

As shown in FIG. 9, the matching/switching network 66 is interconnected to the driver-side antennas 44 and 46 by connections 68 and 70 and to the passenger-side antennas 44 and 46 by connections 72 and 74, respectively. Additionally, the control circuit 60 is interconnected to the network 66 by a feedback loop 76. The antenna matching/switching network 66 functions to accept the signal from the antennas 44 and 46 and to send the appropriate signal to the receiver and detector circuit 62. The feedback loop 76 from the control circuit 60 to the matching/switching network 66 enables the control circuit 60 to specify which of the antennas to actively accept a signal from, preferably when a strong signal from one of the antennas 44 and 46 is detected.

It will be understood that it has been found that the matching network 66 provides additional accuracy in the signal processing of the system 40 but is not an essential component depending upon the type of antennas 44 and 46 employed as well as other factors such as the length and type of connecting wiring, etc.

Figure 10:
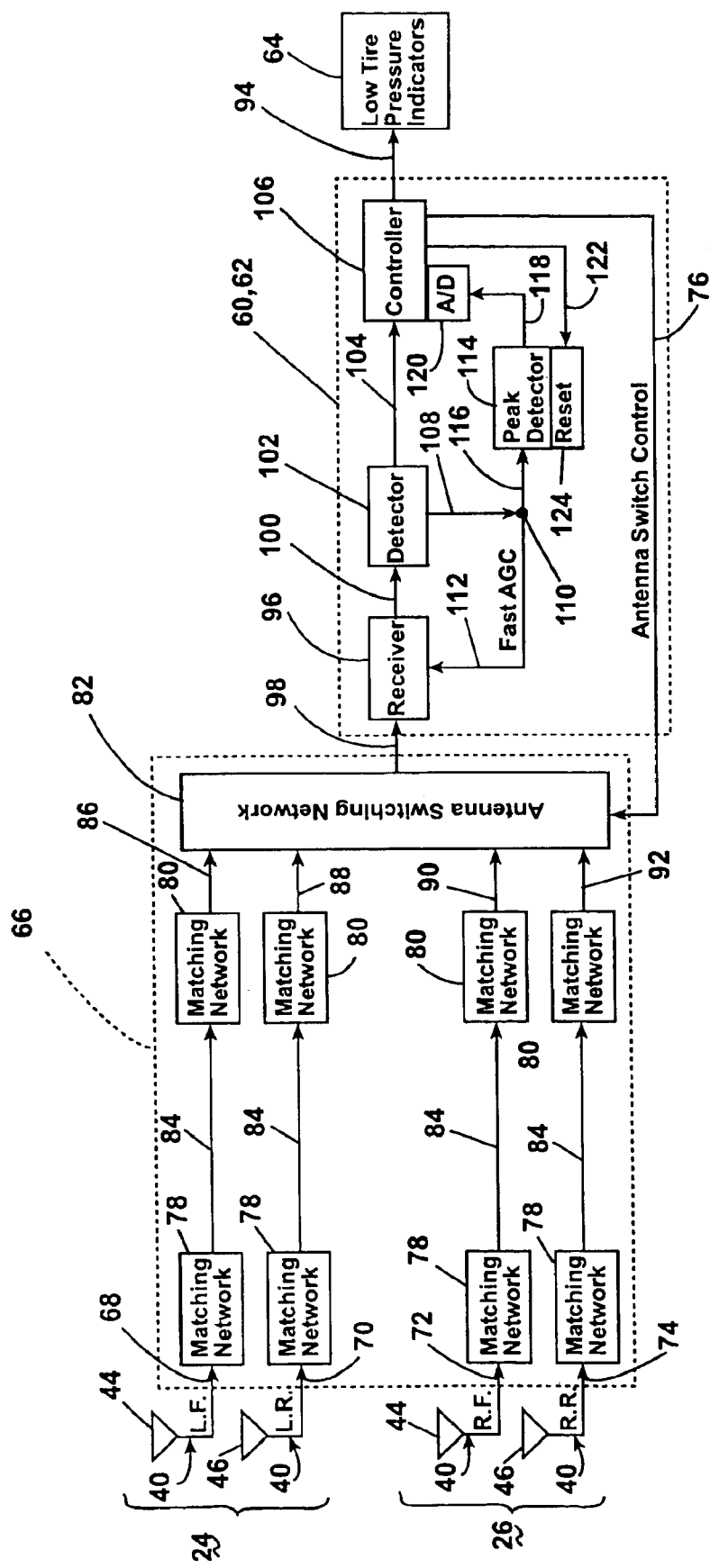
FIG. 10 is a schematic view of the control circuit of FIG. 9 modified to show matching networks provided on each of the antenna systems for the drivers- and passenger-side rear view mirrors as well as an antenna switching network to independently control the antenna system on the rear view mirrors.

FIG. 10 shows the control circuit of FIG. 9 which has been expanded to show internal components of the matching/switching network, shown in box form by reference numeral 66, and internal components of the receiver and detector circuit 62 and control circuit 60 also outlined by a box denoted by reference numerals 60, 62. The matching/switching network 66 includes a pair of matching networks 78 and 80 extending between each of the antennas 44 and 46 and an antenna switching network 82. Each of the matching networks 78 and 80 is interconnected by a connection 84.

The matching networks 78 are interconnected to a corresponding connection 68, 70, 72 and 74 of the antennas 44 and 46 of the driver-side mirror 24 and the antennas 44 and 46 of the antenna system 40 of the passenger-side mirror 26, respectively. Each of the matching networks 80 is interconnected to the antenna switching network 82 by corresponding connections 86, 88, 90 and 92, respectively.

The matching networks 78 and 80 are generally provided to ensure that the signal generated by the antennas 44 and 46 are matched to that required by the antenna switching network 82. Namely, the characteristics of the signals generated by the antennas, i.e., impedance, capacitance and inductance, are matched by the matching networks 78 and 80 and provided to the antenna switching network 82 through the connections 86–92. If the signals between the antennas 44 and 46 and the antenna switching network 82 do not require matching, the matching networks 78 and 80 and their corresponding interconnection 84 are not required. Preferably, at least one of the matching networks 78 and 80 match the antenna characteristics with the input of the receiver and detector circuit 62, which will be further described in great detail below.

FIG. 10 also shows the control circuit 60 and receiver and detector circuit 62 shown in greater detail. A box 60, 62 is formed around the receiver and detector circuit 62 and the control circuit 60. As described above, the output of the control circuit 60 is interconnected to the indicator 64 by a connection 94. The antenna switching network 82 is interconnected to a receiver 96 of the receiver and detector circuit 62 by a connection 98. The receiver 96 accepts an analog signal from the antenna switching network 82 through connection 98, typically a radio frequency signal in the application described herein and performs demodulation on the signal received from the antenna switching network 82 through the connection 98.

The receiver 96 has an output connection 100 interconnected to a detector 102. The detector 102 is preferably an amplitude detector which can convert the signal received from the receiver 96 through the connection 100 into a signal ready for processing, such as a pulse width modulated signal.

The detector 102 has an output connection 104 which is interconnected to a controller 106. The controller 106 deciphers the signal received from the detector 102 and performs the storage and comparator functions described above and outputs any tire pressure values and/or alerts to the indicator 64 through the connection 94. It will be understood that conventional display drivers, adapters, voltage level shifters, etc. are interconnected to the output connection 104 as needed to condition the signal(s) at 94 for the alarm/indicators 64.

The circuit of FIG. 10 is also able to discriminate between the several antenna signals received through the antenna matching/switching network 66. To further this function, the detector 102 is provided with a feedback connection 108 which splits at node 110 and provides inputs into the receiver 96 through connection 112 and to a peak detector 114 through a connection 116. The peak detector 114 has an output connection 118 which is interconnected to the controller 106 through an optional analog-to-digital converter 120 to the extent that the output from the peak detector 114 requires conversion to a digital signal by the A/D converter 120.

It will be understood that a digital system can be implemented without departing from the teachings of this specification. For example, the A/D converter 120 could be removed from its location in FIG. 10 and a D/A converter (not shown) could be located on the feedback loop 76 to the extent analog signals are received by the receiver 96. In any event, the schematic shown in FIG. 10 is by example only and a variety of circuits for accomplishing the functions of the components thereof can be employed without departing from the scope of this invention.

Figure 10A:
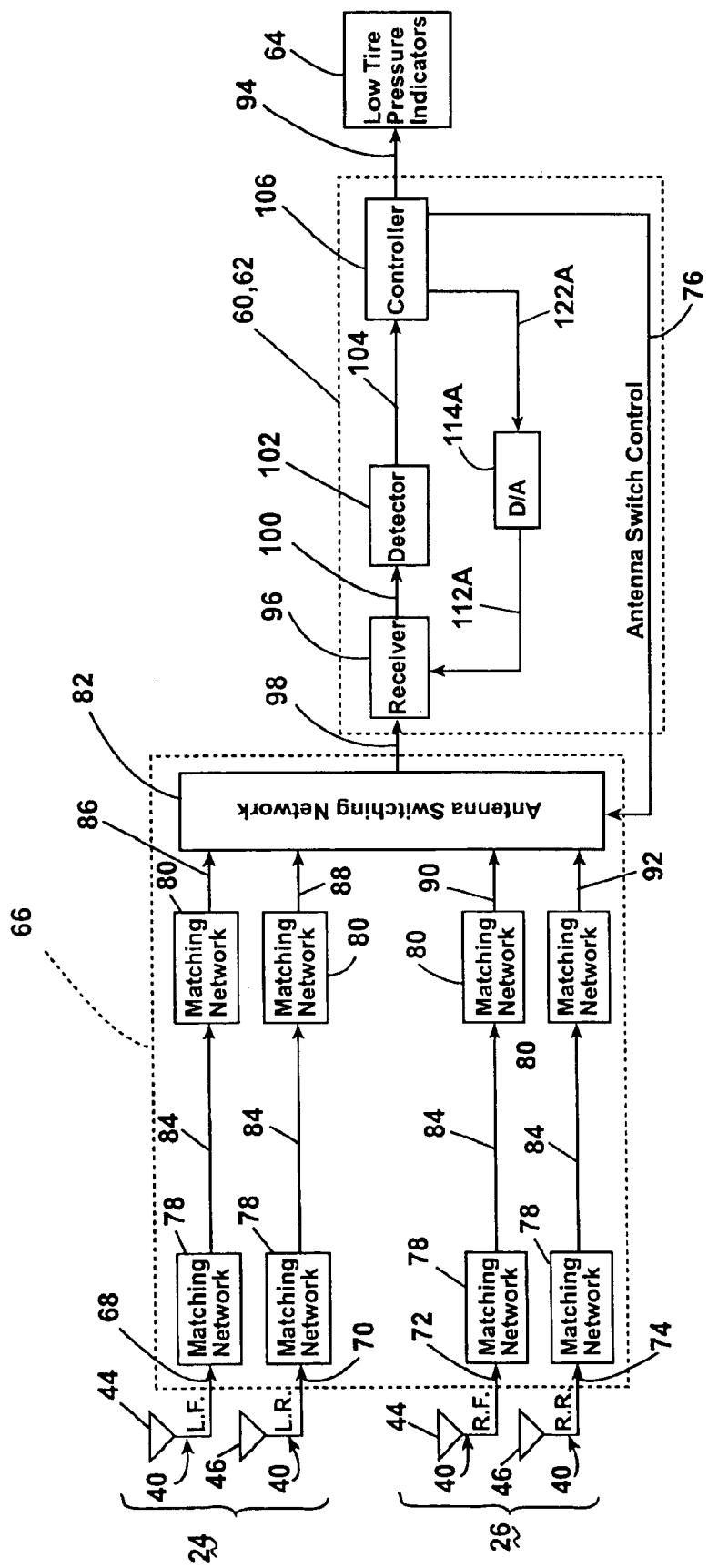
FIG. 10A is a schematic view of an alternative arrangement of the control circuit of FIG. 10 modified to show a digital system for determining the peak signal detected by the circuit.

FIG. 10A is a schematic view of such an alternative arrangement of the control circuit of FIG. 10 modified to show a digital system for determining the peak signal detected by the circuit. The peak detector 114 and A/D converter 120 have been replaced with a D/A converter 114A located between connections 112A and 122A.

Figure 10B:
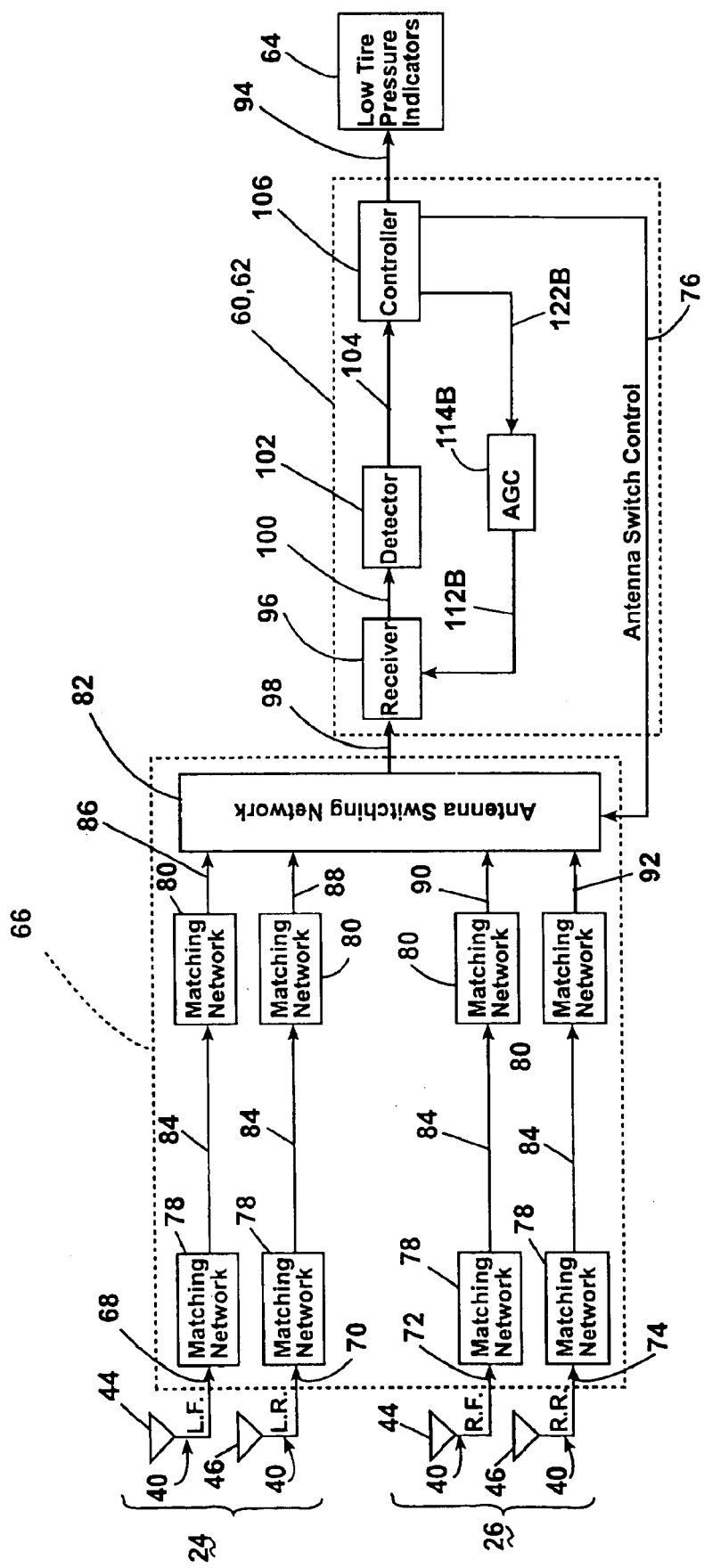
FIG. 10B is a schematic view of another alternative arrangement of the control circuit of FIG. 10 modified to show an automatic gain control adjuster for a receiver in the circuit for determining the peak signal detected by the circuit.

FIG. 10B is a schematic view of another alternative arrangement of the control circuit of FIG. 10 modified to show an automatic gain control adjuster 114B located between connections 112B and 122B for the receiver 96 in the circuit for determining the peak signal detected by the circuit. In operation, the gain control adjuster 114B is actuated, thereby changing the gain of the receiver 96, until only one signal is detected by the detector 98, thus ensuring that the signal with the highest signal strength is detected.

Returning to FIG. 10, the controller 106 has a feedback connection 122 interconnected to a reset portion 124 of the peak detector 114 whereby, upon a signal from the controller 106, the reset portion 124 of the peak detector 114 erases any stored peak detection data detected from the signal received from the detector 108 through connection 116. The feedback loop 76 from the controller 106 to the antenna switching network 82 operates to permit the controller 106 to send a signal to the antenna switching network 82 to select a signal from a particular antenna 44, 46, from a particular mirror 24, 26 through the connection 98 to the receiver 96.

The method of operation of the antenna system for detecting a signal received by the antennas 44 and 46 of the antenna system 40 provided on each of the driver-side and passenger-side mirrors 24 and 26 will now be described.

Typically, tire pressure sensors 28 transmit frames of data several times over predetermined time intervals. However, to conserve battery power, these data frames are often transmitted at sporadic intervals depending upon various factors, such as the speed of the rotation of the wheel and delays between changes of speed, etc. The signals from the antennas 44, 46 on each of the mirrors 24 and 26 are continually sent through connections 68–74 into the antenna matching/switching network 66. The signals are matched by any matching networks 78 and 80 present within the matching/switching network 86 and sent to the antenna switching network 82 through connections 86–92, respectively.

The antenna switching network 82 serially selects one of the signals provided through connections 86, 88, 90 and 92 and outputs the signal through connection 98 into the receiver 96. The receiver 96 amplifies and filters the received signal and outputs the signal through connection 100 to the detector 102. The detector 102 detects the amplitude of the received signal and converts the received signal to a pulse information signal and outputs the information signal through connection 104 to the controller 106. Also, the detector 102 outputs a reception strength signal through connection 108 to the receiver 112. This return of the reception strength signal from the detector 102 to the receiver 96 through the connections 108 and 112 acts as a quick-response "gain control" to adjust the gain of the signal detected by the receiver 96 to correct for strong or weak signals received by the receiver 96 from the antenna switching network 82.

The reception strength signal from the detector 102 is also sent through connection 108 and connection 116 to the peak detector 114 which compares the peak amplitude of the reception strength signal provided by the detector 102 to previous peaks detected by the peak detector 114. The peak detector 114 outputs the peak amplitude through connection 118 and A/D converter 120 to the controller 106. The detector 102 also outputs the reception strength signal through connections 104 to the controller 106.

Normally, the controller 106 would sequentially switch the source antenna 44, 46 (i.e., "scan" the available antennas), until an information signal is received through connection 104 by the controller 106. The controller 106 then records the peak signal value received through the converter 120 from each of the antennas 44, 46—resetting the peak detector 114 each time another antenna 44, 46 is switched into the circuit. The controller 106 "locks" on to the antenna 44, 46 from which the peak signal was received (i.e., produced the greatest reception strength signal through converter 120 detected by the controller 106) and records the information signal (through connection 104) from that antenna 44, 46. When a frame of data has thereby been collected, system 40 updates the particular portion of the indicator 64 associated with that particular antenna 44, 46 used to collect the data frame. The controller 106 can also additionally use partial or complete data frames to verify the validity of the information signal, e.g., to protect against false indicators from nearly vehicles. The controller 106 then returns to the scan mode.

Generally, the controller 106 compares the information signal provided by the detector 102 through connection 104 to the peak signal sent by the peak detector 114 through the connection 118 and the optional A/D converter 120. The controller then saves the detected information signal 104 in memory and scans the signals from the remaining antennas 44 and 46 and receives a signal through connection 98 from the antenna switching network 82 in similar manners.

If the signal sent by the antenna switching network is not equal to the peak signal sent by the peak detector 114, the controller cycles through the signals received by the receiver/detector circuit 62 until the signal sent by the detector 102 through connection 104 to the controller 106 equals the peak signal sent through connection 108 and optional A/D converter 120 by the peak detector 114. The strongest signal from the multiple antennas has thereby been identified.

At this point, the controller sends a signal through connection 122 to the reset portion 124 of the peak detector 114 to set the peak value saved in the peak detector 114 to zero. At the same time, the controller 106 sends a signal through feedback loop 76 to instruct the antenna switching network 82 to accept a signal from the antenna whose signal equals the peak for an extended period of time. Thus, a full data frame from the peak signal antenna can be detected.

Once a full data frame is detected by the controller 106, the controller 106 outputs the tire pressure value to the indicator 64 through connection 94. Further, the controller 106 can also perform the comparison to predetermined tire pressure values to determine whether the tire pressure value is outside a predetermined range and should provide an alert to the vehicle operator.

This type of sequential scanning approach to processing signals received from mirrors located on vehicle antennas is far more beneficial than those systems known in the prior art. For example, because the antenna switching network 82 is instructed to detect the strongest signal received from the four antennas, the antenna system 40 works much more on a "directional" basis rather than a "sensor specific" basis. Put more simply, the system of the present invention does not require each tire pressure sensor to transmit a specific identification code. In actuality, the particular identification number of a tire pressure sensor is irrelevant (although an identification code does help to discriminate false signals from tires on vehicles nearby to the vehicle at issue). Rather, the tire pressure sensing system senses the signal from each antenna, directionally determines if a signal is being detected by a particular antenna and activates that antenna and deactivates the other antennas of the system so that the tire pressure sensing system directionally adjusts based upon the strength of a signal received by a particular antenna.

The following paragraphs summarize various applications for the inventive antenna system. These applications relate both to the monitoring of internal vehicle settings, calibrations, and other diagnostics as well as communications with sources external to the vehicle and remote therefrom.

Figure 11:
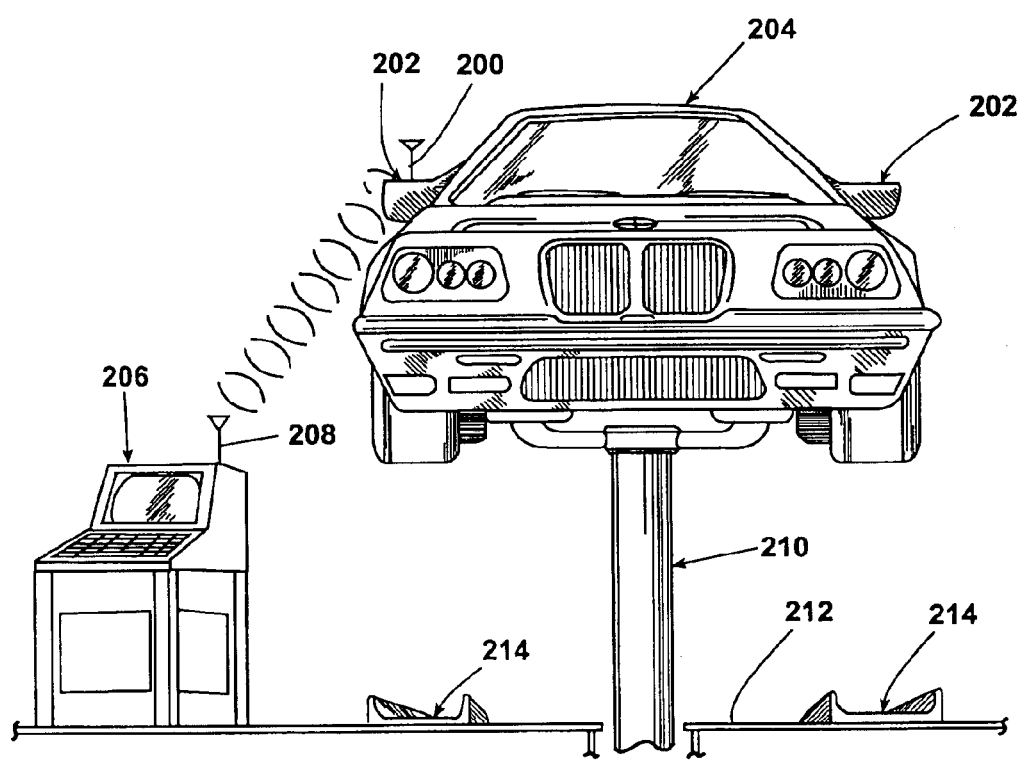
FIG. 11 is a front perspective view of a vehicle with an antenna system located on an external mirror provided on an hydraulic lift in a service station whereby the antenna system on the vehicle transmits vehicle diagnostic data to a vehicle diagnostic computer located adjacent thereto.

With regard to the monitoring of internal vehicle diagnostics, the antenna system can be used in connection with the tire pressure monitoring system as described above. Further, as shown in FIG. 1, an antenna system 200, as described herein, provided on an external mirror 202 of a vehicle 204 can be used in connection with a vehicle diagnostic computer 206 provided with a transceiver schematically represented by reference numeral 208. In the example shown in FIG. 11, the vehicle 204 is shown in a typical hydraulic lift 210 extending upwardly from a ground surface 212 on which typical vehicle tire grooves 214 are provided as are well known to be located in service stations. In use, the antenna system 200 can be interconnected to a diagnostic computer (not shown) internal to the vehicle 204 which is adapted to transmit relevant vehicle diagnostic data to the vehicle diagnostic computer 206. The antenna system 200 can be actuated to provide the vehicle diagnostic data in a number of ways. For example, the vehicle 204 could be provided with a user-actuated button or switch to signal the vehicle diagnostic computer to send the vehicle diagnostic data via the antenna system 200. Alternatively, the vehicle diagnostic computer 206 provided in the service station and the environment of FIG. 11 can be actuated by a service station attendant to transmit an actuation signal through the transceiver 208 to the antenna system 200 to instruct the vehicle diagnostic computer to send a return signal with the vehicle diagnostic data.

The antenna system described herein can also be used to transmit a signal through the antenna system to a receiver located remote from the vehicle. The following paragraphs describe these various uses.

Figure 12:
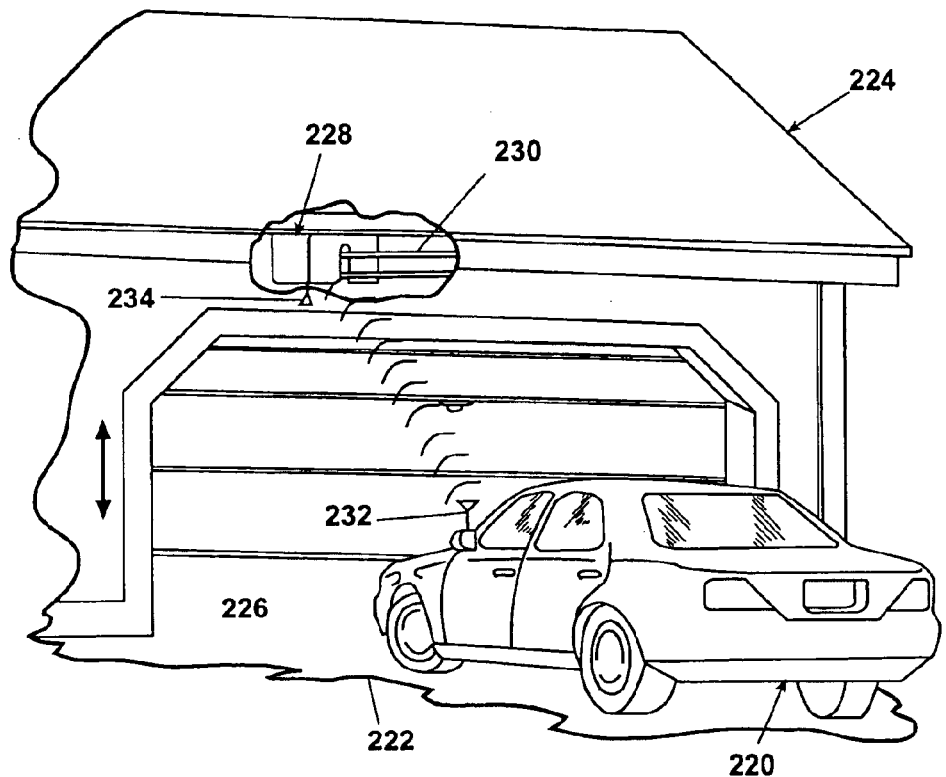
FIG. 12 is a front perspective view of a vehicle located adjacent a garage provided with a garage door opener whereby an antenna system located on an exterior mirror of the vehicle can transmit a signal to actuate the garage door opener.

FIG. 12 shows a vehicle 220 parked on a driveway 222 adjacent a typical garage 224. The garage 224 is provided with a vertically-movable garage door 226 interconnected to a garage door opener 228 shown in the broken-away portion of FIG. 12. The garage door opener 228 can be any conventional garage door opener interconnected to the garage door 226 by a drive system 230 such as a chain, pulley, gear, screw, etc. The vehicle 220 has been provided with an antenna system 232 as previously described which is capable of sending an actuation signal to the garage door opener 228 to signal the garage door 226 to be moved to an open or a closed position via the drive system 230. The garage door opener 228 is typically provided with a receiving antenna 234 capable of receiving a signal from the antenna system 232 on the vehicle 220 and signaling the garage door opener 228 to move the garage door 226 in the desired direction. If more than one antenna is provided in the antenna system 232, the antennae can be sequentially activated to increase the quality and breadth of the signal to the garage door opener 228.

Preferably, the antenna system 232 of the vehicle 220 is equipped with a "learn" circuit (not shown) capable of receiving a signal from a conventional garage door opener as is well known in the art and saving the signal so that the signal can be transmitted via the antenna system 232 to the receiving antenna 234 of the garage door opener 228. Preferably, the antenna system 232 on the vehicle 220 can thereafter be selectively actuated by a user to send the garage door opening signal to the receiving antenna 234 on the garage door opener 228 when the vehicle 220 is in sufficient proximity to the garage 224.

Figure 13:
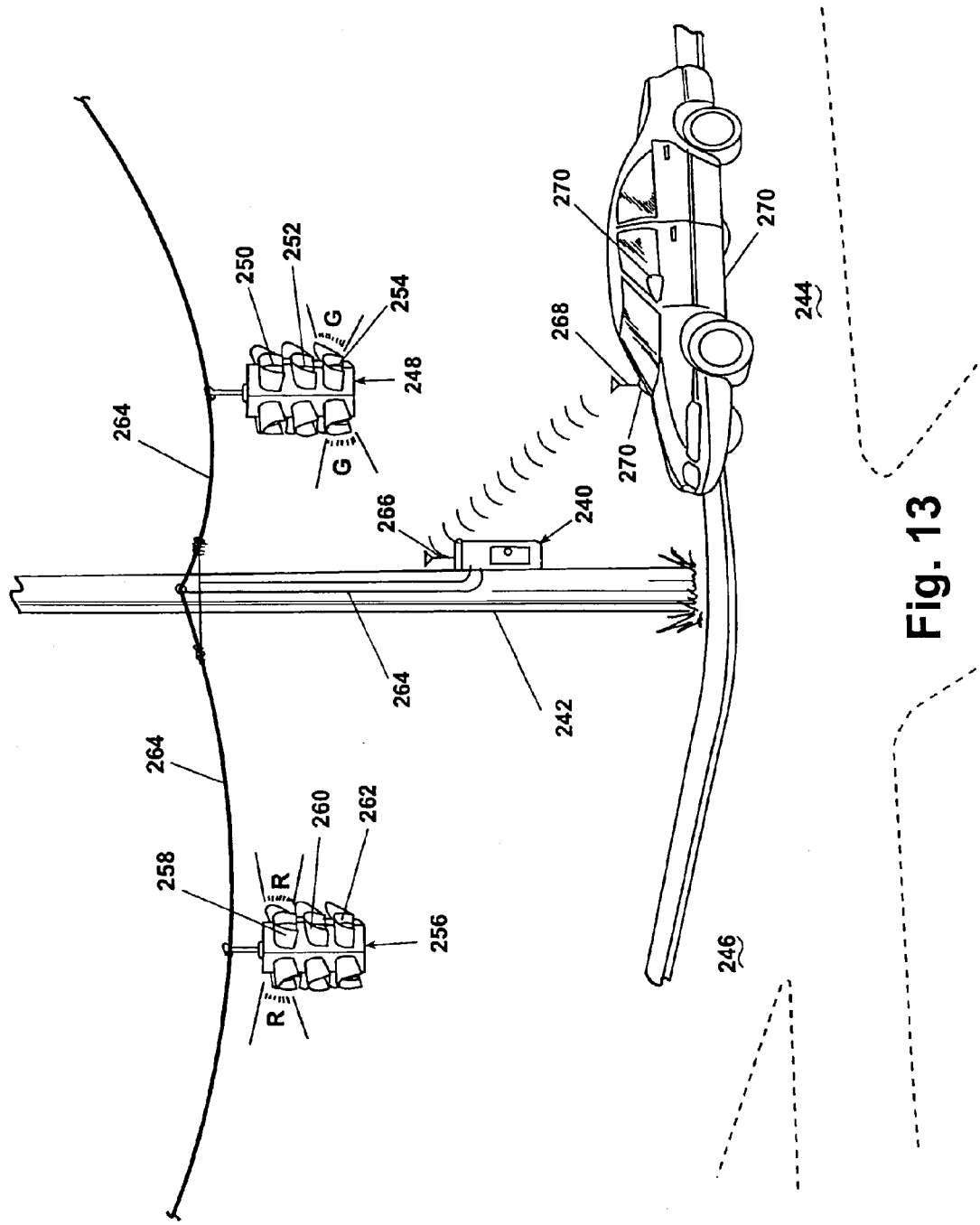
FIG. 13 is a perspective view of a vehicle located on a cross street having signal lamps interconnected to a traffic control system whereby the vehicle antenna system can transmit its presence to the traffic control system.

FIG. 13 shows another use for the antenna system described herein for use in transmitting a signal to a traffic light control system 240 such as those typically provided on a pole 242 adjacent an intersection of a first street 244 and a cross street 246. Typically, the first cross street 244 is provided with a first traffic signal 248 having red, yellow, and green signal lamps 250, 252, and 254, respectively. The second cross street 246 is typically provided with a second traffic signal 256 also w provided with red, yellow, and green signal lamps 258, 260, and 262, respectively. The significance to vehicle operators of the signal lamps 248 and 256 is well known and need not be described. The first and second traffic signal lamps 248 and 256 are interconnected by conduit 260 from each of the signal lamps 248 and 256 to the pole 242 and to the traffic control system 240.

The traffic control system 240 is preferably provided with a receiving antenna 266 adapted to receive a signal from an antenna system 268 mounted to an external mirror 270 of a vehicle 272. The antenna system 268 can preferably program to intermittently send a "presence" signal as the vehicle 272 is driven. To the extent that the receiving antenna 266 of the traffic control system 240 is located in sufficient proximity to the antenna system 268 on the vehicle 272, the traffic control system 240 can evaluate the number of vehicles and their location relative to the traffic control system 240 on the pole 242 and make a determination of which of the red, yellow and green signal lamps to activate on the first and second traffic signal lamps 248 and 256.

Thus, if the vehicle 272 were the only vehicle on the cross street 244 and no vehicles were located in sufficient proximity on the second cross street 246, the first signal lamp 248 could have its green signal lamp 254 actuated by the traffic control system 240 and the red signal lamp 258 on the second traffic signal lamp 256 could be actuated to allow the vehicle 272 to pass unimpeded without encountering a red light. Thus, the potential for gridlock and traffic jams is reduced. Further, the traffic control system 240 could be adapted to monitor and/or transmit statistical data on the numbers of cars passing through the intersection of the first and second cross streets 244 and 246 whereby traffic could be controlled in a city or regional area on a map or scale.

The antenna system described herein can also be used to receive signals from a transmitting antenna. Various uses of the antenna system to receive these signals will now be described.

Figure 14:
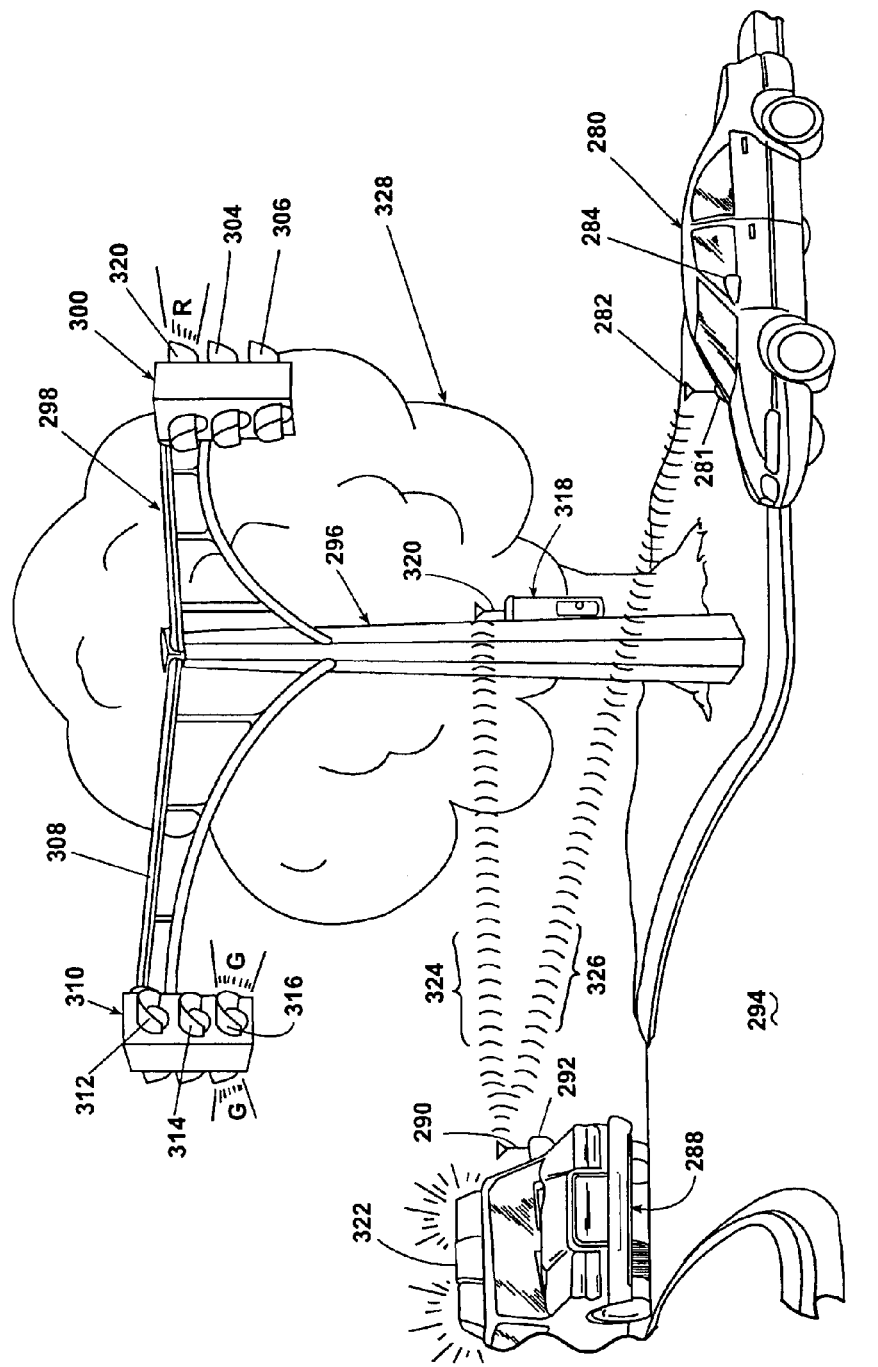
FIG. 14 is a perspective view of a vehicle located on a first cross street and an approaching emergency vehicle located on a second cross street whereby antenna systems on the passenger vehicle and the emergency vehicle interact with a traffic control system to provide increased safety and prevent passenger vehicle collisions with emergency vehicles.

FIG. 14 shows a perspective view of a vehicle 280 provided with an antenna system 282 on an external mirror 284 as described herein located on a first cross street 286. An emergency vehicle 288 provided with an antenna system 290 on an external U mirror 292 as described herein is located on a second cross street 294. A pole 296 is provided which has a first cantilever arm 298 having a first traffic signal lamp 300 provided with conventional red, yellow, and green lamps 302, 304, and 306, respectively. The pole 296 also has a second cantilever arm 308 provided with a second traffic signal lamp 310 provided with conventional red, yellow, and green lamps 312, 314, and 316. The operation of these traffic signal lamps is well known. The pole 296 is also provided with a traffic control system 318 having an antenna system 320 thereon.

The antenna system 290 on the emergency vehicle 288 can operate in one of two ways. First, the antenna system 290 can be actuated with sirens 322 of the emergency vehicle 288 to transmit a first signal 324 to the antenna system 320 on the traffic control signal 318 to ensure that the second traffic signal 310 actuates the green signal lamp 316 so that the emergency vehicle 288 can pass unimpeded along the second cross street 294 through the intersection defined with the first cross street 286. Simultaneous with the actuation of the green signal lamp 316 on the second traffic signal 310, the red signal lamp 302 on the first traffic signal lamp can be actuated to signal vehicles on the first cross street such as the vehicle 280 to stop their forward progress and allow the emergency vehicle 288 to pass. The antenna system 290 on the emergency vehicle 288 can also be adapted to send a second signal 326 detectable by the antenna system 282 on the vehicle 280 that the emergency vehicle 288 is in the area and to alert the driver of the vehicle 280. This system can be extremely beneficial if obstructing objects such as the tree 328 located adjacent the cross streets 286 and 294 obstructs the line-of-sight of the drivers of the passenger vehicle 280 and emergency vehicle 288. Thus, accidents between passenger vehicles and emergency vehicles could be reduced by the signals sent by the cooperating antenna systems 282, 290, and 320 of the passenger vehicle 280, emergency vehicle 288 and traffic control system 318, respectively.

The antenna system described herein can also be used as a receiving antenna for vehicle remote security and operation devices such as remote keyless entry (RKE) systems. The RKE systems are well known in the art as a handheld console wherein an operator of a vehicle can press certain buttons to lock and unlock the doors of the vehicle, set off a vehicle alarm or perhaps remotely actuate the ignition system of the vehicle.

Figure 15:
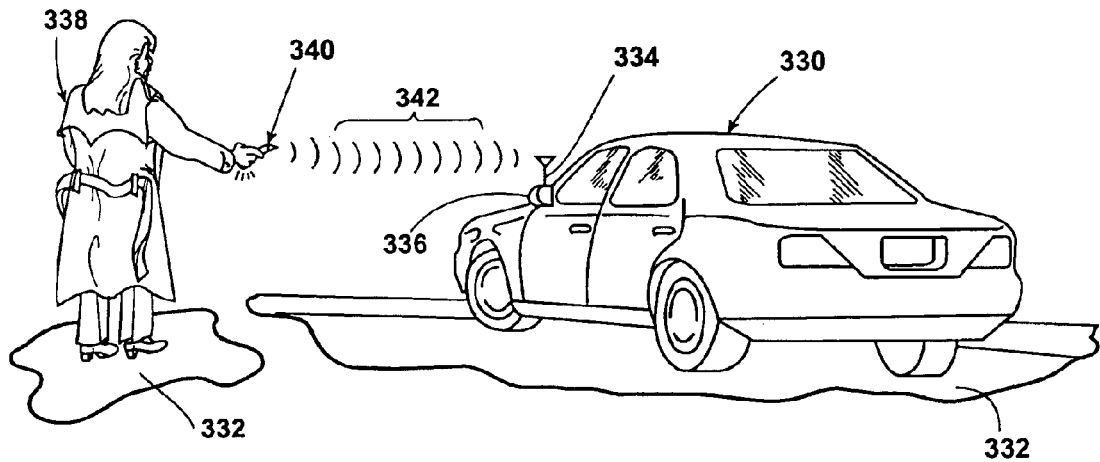
FIG. 15 is a perspective of a vehicle operator actuating a remote keyless entry system to send a wireless signal to actuate locking or ignition systems on a vehicle via an antenna system on an external mirror.

As shown in FIG. 15, a vehicle 330 is shown parked on a ground surface 332. The vehicle 330 is provided with an antenna system 334 on an external mirror 336 as described herein. A vehicle operator 338 is shown standing remote from the vehicle 330 holding an RKE device 340 capable of sending a signal 342 detectable by the antenna system 334 on the external mirror 336 to the extent that the RKE device 340 is located in sufficient proximity to the vehicle 330.

The antenna system 334 can be provided with circuitry which "learns" the signal 342 to be transmitted by the RKE device 340 to perform the functions discussed above. Contrary to known RKE devices currently employed, any receiving antennas are typically located within the vehicle interior or within the vehicle frame and do not typically effectively receive the low-powered radio frequency signal of an RKE device 340.

The antenna system 334 located externally with respect to the vehicle 330 such as on the external mirror 336 provides much greater detection of the signal 342 of the RKE device 340, thus allowing the vehicle operator 338 to lock or unlock the vehicle doors, set off an alarm or actuate the vehicle ignition system from greater distances.

The antenna system described herein can also be used in a "bi-directional" manner, i.e., to transmit and receive signals to and from a device located remotely from a vehicle. Examples of various uses of this type are described in the following paragraphs.

Figure 16:
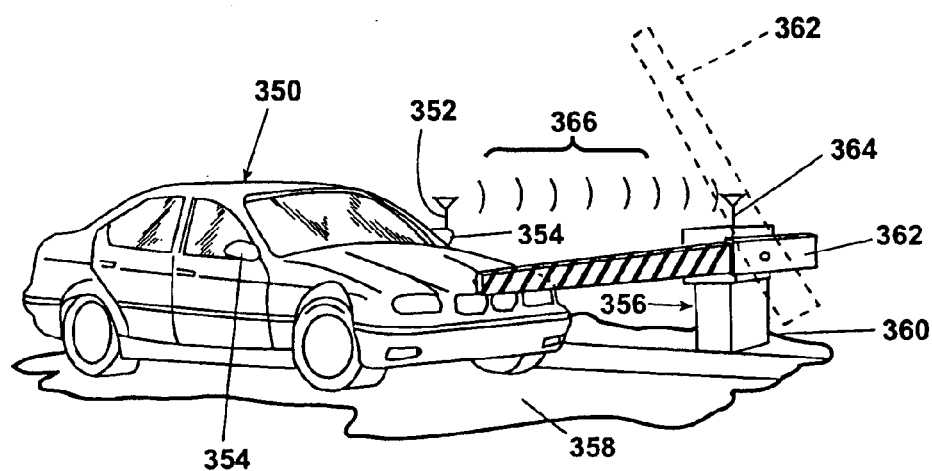
FIG. 16 shows a perspective view of a vehicle having an antenna system on an external mirror located adjacent to a gating system having a movable gate provided with a receiving antenna whereby the vehicle antenna system can transmit data to the gating system antenna denoting the presence of the vehicle and signaling the gate to open or close and providing any access codes required by the gating system.

FIG. 16 shows a vehicle 350 having an antenna system 352 on an external mirror 354 as described herein employed in connection with a parking ramp, parking lot or toll booth 356 whereby the vehicle 350 is allowed to proceed on a roadway 358 pending the entry into the gating system 356. The gating system 356 comprises a housing 360 with a movable gate 362 between a first position whereby the gate 362 obstructs the vehicle's progress 350 along the roadway 358 and a second position shown in phantom lines in FIG. 16 whereby the gate 362 is open and the vehicle 350 may proceed along the roadway 358.

Examples of these gating systems 356 can be found in parking lots, parking ramps and toll booths and are well known in the art. The gating system 356 of FIG. 16 has been provided with an antenna system 364 capable of receiving a signal from the antenna system 352 on the vehicle 350 to the extent that the vehicle 350 is located in sufficient proximity to the gating system 356. The signal 366 between the antenna system 352 on the vehicle 350 and the antenna system 364 on the gating system 356 could transmit an actuation signal to instruct the gating system 356 to move the gate 362 between the open and closed positions or provide a "key card access" signal consisting of a particular identification code of an access card owned by the operator of the vehicle 350.

This feature would eliminate the requirement that operator of the vehicle 350 extend his/her arm out of the vehicle 350 interior to place or slide the access card within a card reader located in prior art gating systems. Rather, the operator of the vehicle 350 could merely actuate the antenna system 352 to send the identification code contained in the access card to the antenna system 364 on the gating system 356 to alter the position of the gate 362. The vehicle 350 could include a card reader slot (not shown) interconnected to learning circuitry whereby the operator of the vehicle 350 could selectively send the signal of a particular actuator card to the gating system 356 (e.g., if the operator of the vehicle 350 had more than one access card for various parking ramps or lots). For commercial, charge-by-the-hour or -day parking ramps, the operator of the vehicle 350 could also insert his/her credit card into the card reader slot to instruct the antenna system 352 to transmit credit card information to the antenna system 364 on the gating system 356 so that the operator of the vehicle 350 was charged for the time in the parking lot or ramp or toll both. Thus, the requirement for parking ramp or toll both attendants would be eliminated and the charges for the parking ramp, lot or toll both could be automatically charged to the credit card account of the operator of the vehicle 350.

Figure 17:
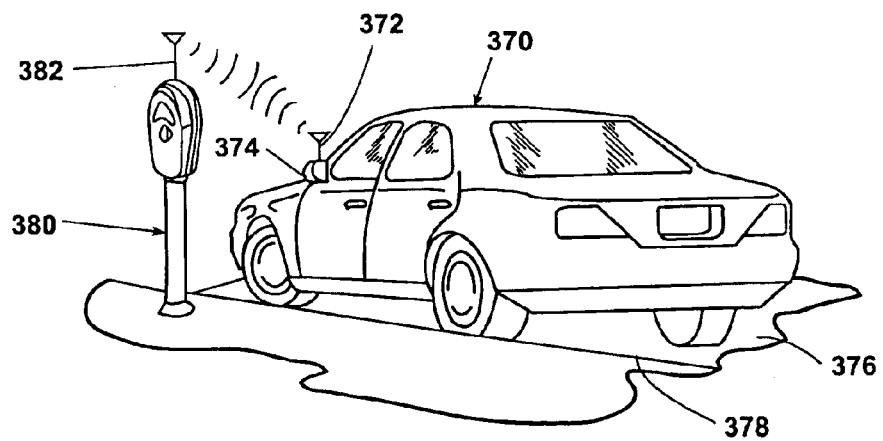
FIG. 17 is a perspective view of a vehicle having an antenna system on an external mirror located adjacent to a parking meter having an antenna system whereby the vehicle can transmit data to the parking meter to provide payment for charges for the parking meter or instruct the parking meter of the presence of a car with handicap access therefor.

The concept described in the above paragraph with respect to a parking ramp, parking lot, or toll booth could also apply to a vehicle 370 provided with an antenna system 372 for an external mirror 374 as described above located on a roadway 376 adjacent a curb 378 having a parking meter 380 provided with an antenna system 382 as shown in FIG. 17. Thus, as described above, the operator of the vehicle 370 could transmit credit card or handicap access information to the antenna system 382 on the parking meter 380 to have charges for the parking ramp applied to a credit card or indicate handicap access to the parking meter and avoid incurring charges on the parking meter 380.

Figure 18:
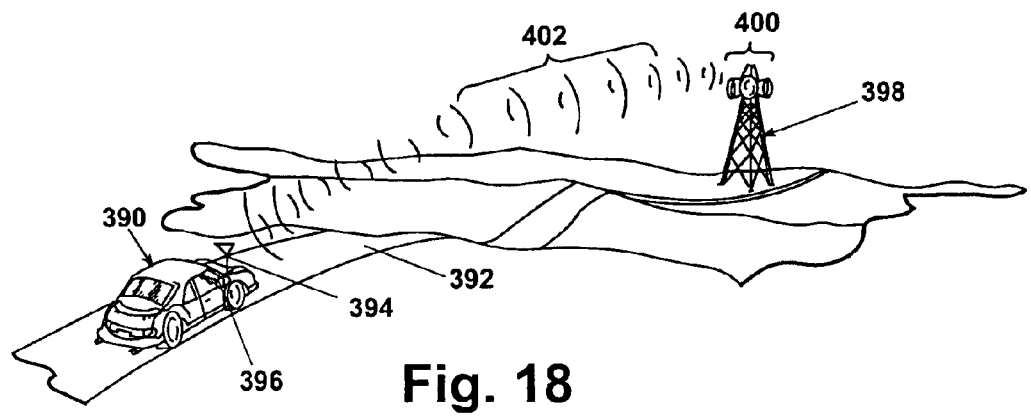
FIG. 18 is a perspective view of a vehicle with an antenna system on an external mirror sending cellular telephone signals between the vehicle and a cellular telephone tower provided with an antenna system thereon.

FIG. 18 shows a perspective view of a vehicle 390 travelling on a roadway 392 provided with an antenna system 394 located on a vehicle exterior mirror 396. A cellular telephone tower 398 provided with several antenna systems 400 thereon. The antenna system 394 on the vehicle 390 is interconnected to a cellular telephone (not shown) located within the vehicle 390 whereby the antenna system 394 can transmit and receive a signal 402 to the receiving antenna system 400 on the cellular telephone tower 398. Rather than requiring an additional or specialized antenna for the cellular telephone located within a vehicle, the antenna system 394 can be actuated when the cellular telephone within the vehicle 290 is used to allow outgoing and incoming telephone calls. Thus, the antenna system 394 can provide an antenna for the cellular telephone located within the vehicle 390 without requiring an unsightly additional antenna or an antenna of reduced effectiveness provided internally of the vehicle 390.

Figure 19:
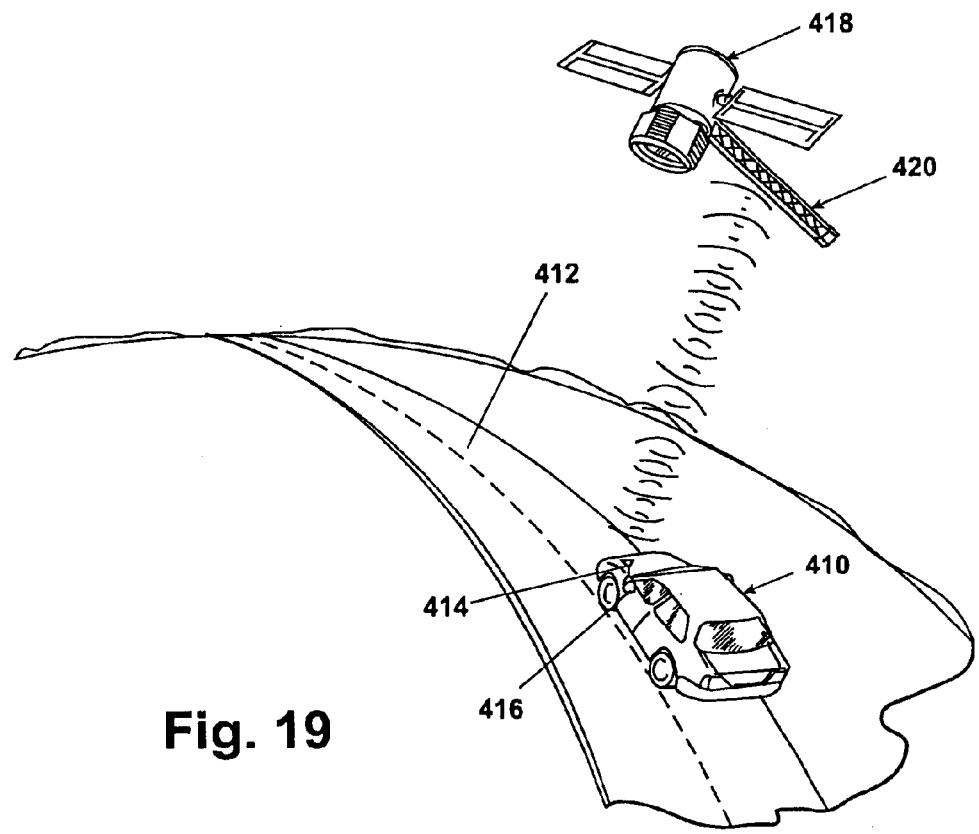
FIG. 19 is a perspective view of a vehicle having an antenna system on an external mirror transmitting and receiving global positioning data from a satellite with an antenna system thereon.

FIG. 19 shows a vehicle 410 travelling on a roadway 412 having an antenna system 414 provided on an external mirror 416 of the vehicle 410. A satellite 418 is shown in orbit above the vehicle 410 and preferably has an antenna system 420 interconnected to a global positioning satellite (GPS) system which is a well known system for locating an object longitudinally and latitudinally anywhere on the earth. The antenna system 414 on the vehicle 410 is preferably interconnected to a GPS device (not shown) located within the vehicle 410 whereby the antenna system 414 can transmit and receive a signal from the antenna system 420 and the satellite 418 to enable a GPS device located within the vehicle interior to display the location of the vehicle 410 without requiring additional antenna systems provided for the vehicle 410.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

What is claimed is:

1. A vehicle antenna system, comprising:
   a first directional antenna and a second directional antenna, said first- and second-directional antennas being located on or within an exterior mirror of a vehicle and having first- and second-directional signal detection fields, respectively;
   a switching network that selects one of said first- and second-directional antennas to be a selected antenna;
   a receiver coupled to said switching network to receive a selected antenna signal from the selected antenna via said switching network; and
   a controller coupled to the receiver to output a control signal corresponding to the antenna signal received by the receiver.

2. The vehicle antenna system of claim 1, further comprising:
   a detector connected between said receiver and said controller; and
   a peak detector connected between said detector and said controller,
   wherein said detector detects an amplitude of the selected antenna signal and outputs a detector signal corresponding to the selected antenna signal's amplitude to said peak detector and said controller,
   wherein said controller compares the amplitude of the selected antenna signal's amplitude to at least one previous peak amplitude, saves a peak value and outputs a peak detector signal corresponding to the peak value to said controller, and
   wherein said controller compares the detector signal for each of said first- and second-directional antennas with the peak detector signal to identify which of said antennas outputs the strongest antenna signal.

3. The vehicle antenna system of claim 2, wherein the detector signal is a digital detector signal, and wherein the system further comprises an analog-to-digital converter connected between said peak detector and said controller to convert the peak detector signal into a digital peak detector signal.

4. The vehicle antenna system of claim 2, wherein said peak detector further comprises a reset portion for resetting the peak value.

5. The vehicle antenna system of claim 2, further comprising a plurality of tire pressure sensors, each tire sensor transmitting a sensor output signal detectable by at least one of said first- and second-directional antennas.

6. The vehicle antenna system of claim 5, further comprising:
   a threshold detector that compares the detector signal for each of said first- and second-directional antennas with a predetermined threshold; and
   a low pressure warning indicator coupled to the threshold detector to indicate when the detector signal falls below the predetermined threshold, indicating low tire pressure.

7. The vehicle antenna system of claim 5, wherein each tire pressure sensor has a sensor transmission field, and wherein the sensor transmission field overlaps at least one of said first- and second-directional signal detection fields.

8. The vehicle antenna system of claim 1, further comprising at least one matching network connected between said first- and second-directional antennas and said switching network.

9. The vehicle antenna system of claim 8, wherein each of said first- and second-directional antennas has a corresponding matching network.

10. The vehicle antenna system of claim 1, further comprising:
    a signal generator that generates a system output signal for reception by a remote circuit external to the vehicle; and
    a transmitter for transmitting the system output signal to the remote circuit via said at least one of said first- and second-directional antennas over first- and second-directional transmission fields, respectively.

11. The vehicle antenna system of claim 10, wherein the remote receiver is located on a vehicle diagnostic computer, and wherein said signal generator generates vehicle diagnostic data.

12. The vehicle antenna system of claim 10, wherein the remote receiver is located on a garage door opener, and wherein said signal generator generates conventional garage door opener operation data.

13. The vehicle antenna system of claim 10, wherein the remote receiver is located on a traffic control system, and wherein said signal generator generates a presence signal to indicate the presence of the vehicle at a street intersection.

14. The vehicle antenna system of claim 1, wherein at least one of said first- and second-directional antennas receives an input signal from a remote location outside of the vehicle.

15. The vehicle antenna system of claim 14, wherein the input signal is transmitted by an emergency vehicle.

16. The vehicle antenna system of claim 15, wherein a remote receiver is located on a traffic control system, and wherein the emergency vehicle transmits the input signal to both the remote receiver and at least one of said first- and second-directional antennas.

17. The vehicle antenna system of claim 1, further comprising:
- a signal generator that generates a system output signal for reception by a remote receiver external to the vehicle; and
- a transmitter for transmitting the system output signal to the remote circuit via said first- and second-directional transmission fields, wherein at least one of said first- and second-directional signal detection fields detects a signal from the remote circuit.

18. The vehicle antenna system of claim 17, wherein the remote circuit is located in a vehicle access gate, and wherein the signal generator generates and transmits an access code, vehicle identification and/or payment information.

19. The vehicle antenna system of claim 17, wherein the first- and second-directional antennas transmit and receive telephone signals to and from the remote circuit.

20. The vehicle antenna system of claim 17, wherein the remote circuit is in a global positioning satellite, and wherein the first- and second-directional antennas transmit and receive global positioning information to and from the satellite.

21. The vehicle antenna system of claim 1, wherein said first directional antenna is a forward-directed antenna and said second directional antenna is a rearward-directed antenna.

22. A vehicle antenna system, comprising:
- a first directional antenna and a second directional antenna, said first- and second-directional antennas being located on or within an exterior mirror of a vehicle and having first- and second-directional signal transmission fields, respectively;
- a signal generator that generates a system output signal for reception by a remote receiver outside to the vehicle; and
- a transmitter for transmitting the system output signal to the remote circuit via at least one of said first- and second-directional antennas.

23. The vehicle antenna system of claim 22, wherein the remote circuit is located in a vehicle access gate, and wherein the signal generator generates an access code and the system output signal is vehicle identification and/or payment information.

24. The vehicle antenna system of claim 22, wherein said first- and second-directional antennas transmit telephone signals to the remote circuit.

25. The vehicle antenna system of claim 22, wherein the remote circuit is in a global positioning satellite, and wherein at least one of said first- and second-directional antennas receives global positioning information therefrom.

26. A vehicle antenna system, comprising:
- a first first-directional antenna and a corresponding first second-directional antenna, said first first- and second-directional antennas being located on or within a first exterior mirror of a vehicle and having first first- and second-directional signal detection fields, respectively;
- a second first-directional antenna and a corresponding second second-directional antenna, said second first- and second-directional antennas being located on or within a second exterior mirror of a vehicle and having second first- and second-directional signal detection fields, respectively;
- a switching network that selects one of said first and second first-directional and second-directional antennas to be a selected antenna;
- a receiver coupled to said switching network to receive a selected antenna signal from the selected antenna via said switching network; and
- a controller coupled to the receiver to output a control signal corresponding to the antenna signal received by the receiver.

27. The vehicle antenna system of claim 26, further comprising:
- a detector connected between said receiver and said controller; and
- a peak detector connected between said detector and said controller,
- wherein said detector detects an amplitude of the selected antenna signal and outputs a detector signal corresponding to the selected antenna signal's amplitude to said peak detector and said controller,
- wherein said peak detector saves a peak value and outputs a peak detector signal corresponding to the peak value to said controller, and
- wherein said controller compares the peak detector signal for each of said first and second first- and second-directional antennas to identify which of said antennas outputs the strongest antenna signal.

28. The vehicle antenna system of claim 27, wherein the detector signal is a digital detector signal, and wherein the system further comprises an analog-to-digital converter connected between said peak detector and said controller to convert the peak detector signal into a digital peak detector signal.

29. The vehicle antenna system of claim 28, wherein the digital detector is a pulse width modulated signal.

30. The vehicle antenna system of claim 27, wherein said peak detector further comprises a reset portion for resetting the peak value.

31. The vehicle antenna system of claim 27, further comprising a plurality of tire pressure sensors, each tire sensor transmitting a sensor output signal detectable by at least one of said first and second first- and second-directional antennas.

32. The vehicle antenna system of claim 31, further comprising:
- a threshold detector that compares the detector signal for each of said first- and second-directional antennas with a predetermined threshold; and
- a low pressure warning indicator coupled to the threshold detector to indicate when the detector signal falls below the predetermined threshold, indicating low tire pressure.

33. The vehicle antenna system of claim 31, wherein each tire pressure sensor has a sensor transmission field, and wherein said sensor transmission field overlaps at least one of said first and second first- and second-directional signal detection fields.

34. The vehicle antenna system of claim 26, further comprising at least one matching network connected between said first and second first- and second-directional antennas and said switching network.

35. The vehicle antenna system of claim 34, wherein each of said first and second first- and second-directional antennas has a corresponding matching network.

36. The vehicle antenna system of claim 26, further comprising:
- a signal generator that generates a system output signal for reception by a remote circuit external to the vehicle; and
- a transmitter for transmitting the system output signal to the remote circuit via at least one of said first and second first- and second-directional antennas over first and second first- and second-directional transmission fields, respectively.

37. The vehicle antenna system of claim 36, wherein the remote circuit is located on a vehicle diagnostic computer, and wherein said signal generator generates vehicle diagnostic data.

38. The vehicle antenna system of claim 36, wherein the remote circuit is located on a garage door opener, and wherein said signal generator generates conventional garage door opener operation data.

39. The vehicle antenna system of claim 36, wherein the remote receiver is located on a traffic control system, and wherein said signal generator generates a presence signal to indicate the presence of the vehicle at a street intersection.

40. The vehicle antenna system of claim 26, wherein at least one of said first and second first- and second-directional antennas receives an input signal from a remote location outside of the vehicle.

41. The vehicle antenna system of claim 40, wherein the input signal is transmitted by an emergency vehicle.

42. The vehicle antenna system of claim 41, wherein a remote receiver is located on a traffic control system, and wherein the emergency vehicle transmits the input signal to both the remote receiver and at least one of said first and second first- and second-directional antennas.

43. The vehicle antenna system of claim 26, further comprising:
- a signal generator that generates a system output signal for reception by a remote circuit external to the vehicle; and
- a transmitter for transmitting the system output signal to the remote receiver, and wherein at least one of said first and second first- and second-directional antennas receives an input signal from a remote location outside of the vehicle.

44. The vehicle antenna system of claim 43, wherein the remote circuit is located in a vehicle access gate, and wherein the signal generator generates an access code and the input signal is vehicle identification and/or payment information.

45. The vehicle antenna system of claim 43, wherein at least one of first and second first- and second-directional antennas transmits and receives telephone signals to and from the remote circuit.

46. The vehicle antenna system of claim 43, wherein the remote circuit is in a global positioning satellite, and wherein at least one of said first and second first- and second-directional antennas receives global positioning information from the satellite.

47. The vehicle antenna system of claim 26, further comprising at least one matching network connected between said switching network and said receiver.

48. The vehicle antenna system of claim 47, further comprising at least one matching network connected between said first and second first- and second-directional antennas and said switching network.

49. A vehicle antenna system, comprising:
- a first first-directional antenna and a corresponding first second-directional antenna, said first first- and second-directional antennas being located on or within a first exterior mirror of a vehicle and having first first- and second-directional signal transmission fields, respectively;
- a second first-directional antenna and a corresponding second second-directional antenna, said second first- and second-directional antennas being located on or within a second exterior mirror of a vehicle and having second first- and second-directional signal transmission fields, respectively;
- a signal generator that generates a system output signal for reception by a remote receiver external to the vehicle; and
- a transmitter for transmitting the system output signal to the remote receiver via at least one of said first and second first-directional and second-directional antennas.

50. The vehicle antenna system of claim 49, wherein the remote receiver is located in a vehicle access gate, and wherein the signal generator generates an access code and the input signal is vehicle identification and/or payment information.

51. The vehicle antenna system of claim 49, wherein the first- and second-directional antennas transmit telephone signals to the remote circuit.

52. The vehicle antenna system of claim 49, wherein the remote circuit is in a global positioning satellite, and wherein the first- and second-directional antennas receive global positioning information from the satellite.

53. The vehicle antenna system of claim 49, wherein said first and second first-directional antennas are forward-directed antennas and said first and second second-directional antennas are rearward-directed antennas.

54. A vehicle antenna system, comprising:
- a first first-directional antenna and a corresponding first second-directional antenna, said first first- and second-directional antennas being located on or within a first exterior mirror of a vehicle and having first first- and second-directional signal detection fields, respectively;
- a second first-directional antenna and a corresponding second second-directional antenna, said second first- and second-directional antennas being located on or within a second exterior mirror of a vehicle and having second first- and second-directional signal detection fields, respectively;
- at least one matching network corresponding to at least one of said first and second first- and second-directional antennas and said receiver;
- a switching network coupled to said at least one matching network, wherein said switching network selects one of said first and second first- and second-directional antennas to be a selected antenna;
- a detector connected between said receiver and said controller;
- a peak detector connected between said detector and said controller;
- a receiver coupled to said switching network to receive a selected antenna signal from the selected antenna via said switching network; and
- a controller coupled to the receiver to output a control signal corresponding to the antenna signal received by the receiver,
- wherein said detector detects an amplitude of the selected antenna signal and outputs a detector signal corresponding to the selected antenna signal's amplitude to said peak detector and said controller, wherein said peak detector compares the amplitude of the selected antenna signal's amplitude to at least one previous peak amplitude of a previous selected antenna signal, saves a peak value and outputs a peak detector signal corresponding to the peak value to said controller, and wherein said controller compares the detector signal for each of said first and second first- and second-directional antennas with the peak detector signal to identify which of said antennas outputs the strongest antenna signal.

55. The vehicle antenna system of claim 54, wherein the detector signal is a digital detector signal, and wherein the system further comprises an analog-to-digital converter connected between said peak detector and said controller to convert the peak detector signal into a digital peak detector signal.

56. The vehicle antenna system of claim 54, wherein said peak detector further comprises a reset portion for resetting the peak value to a predetermined value after the strongest antenna signal has been identified.

57. The vehicle antenna system of claim 54, further comprising a plurality of tire pressure sensors, each tire sensor transmitting a sensor output signal detectable by at least one of said first and second first- and second-directional antennas.

58. The vehicle antenna system of claim 57, further comprising:
 a threshold detector that compares the detector signal for each of said forward and rearward-directed antenna with a predetermined threshold; and
 a pressure warning indicator coupled to the threshold detector to indicate when the detector signal passes the predetermined threshold, indicating an unsafe tire pressure.

59. The vehicle antenna system of claim 57, wherein each tire pressure sensor has first- and second-directional transmission fields, and wherein at least one of said first- and second-directional transmission fields overlaps one of said first and second first- and second-directional signal detection fields.

60. The vehicle antenna system of claim 54, further comprising:
 a signal generator that generates a system output signal for reception by a remote receiver external to the vehicle; and
 a transmitter for transmitting the system output signal to the remote receiver.

61. The vehicle antenna system of claim 59, wherein the remote receiver is located on a vehicle diagnostic computer, and wherein said signal generator generates vehicle diagnostic data.

62. The vehicle antenna system of claim 59, wherein the remote receiver is located on a garage door opener, and wherein said signal generator generates conventional garage door opener operation data.

63. The vehicle antenna system of claim 59, wherein the remote receiver is located on a traffic control system, and wherein said signal generator generates a presence signal to indicate the presence of the vehicle at a street intersection.

64. The vehicle antenna system of claim 54, wherein at least one of said first and second first- and second-directional antennas receives an input signal from a remote location outside of the vehicle.

65. The vehicle antenna system of claim 64, wherein the input signal is transmitted by an emergency vehicle.

66. The vehicle antenna system of claim 64, wherein a remote receiver is located on a traffic control system, and wherein the emergency vehicle transmits the input signal to both the remote receiver and at least one of said first and second first- and second-directional antennas.

67. The vehicle antenna system of claim 54, further comprising:
 a signal generator that generates a system output signal for reception by a remote receiver external to the vehicle; and
 a transmitter for transmitting the system output signal to the remote receiver via said first- and second-directional antennas over first- and second-directional fields, wherein at least one of said first- and second-directional signal detection fields detects a signal from the remote circuit.

68. The vehicle antenna system of claim 66, wherein the remote circuit is located in a vehicle access gate, and wherein the signal generator generates and transmits an access code, vehicle identification and/or payment information.

69. The vehicle antenna system of claim 66, wherein at least one of the first and second first- and second-directional antennas transmits and receives telephone signals to and from the remote circuit.

70. The vehicle antenna system of claim 66, wherein the remote location is a global positioning satellite, and wherein the first and second first- and second-directional antennas receive global positioning information from the satellite.

71. A vehicle antenna system, comprising:
 a first first-directional antenna and a corresponding first second-directional antenna, said first first- and second-directional antennas being located on or within a first exterior mirror of a vehicle and having first first- and second-directional signal transmission fields, respectively;
 a second first-directional antenna and a corresponding second second-directional antenna, said second first- and second-directional antennas being located on or within a second exterior mirror of a vehicle and having second first- and second-directional signal transmission fields, respectively;
 a signal generator that generates a system output signal for reception by a remote circuit external to the vehicle; and
 a transmitter for transmitting the system output signal to the remote circuit via at least one of said first and second first-directional and second-directional antennas.

72. The vehicle antenna system of claim 71, wherein the remote circuit is located in a vehicle access gate, and wherein the signal generator generates an access code and the input signal is vehicle identification and/or payment information.

73. The vehicle antenna system of claim 71, wherein the first- and second-directional antennas transmit telephone signals to the remote circuit.

74. The vehicle antenna system of claim 71, wherein the remote circuit is in a global positioning satellite, and wherein the first- and second-directional antennas receive global positioning information from the satellite.

75. The vehicle antenna system of claim 71, wherein said first and second first-directional antennas are forward-directed antennas and said first and second second-directional antennas are rearward-directed antennas.

* * * * *